United States Patent
Nesbitt et al.

(10) Patent No.: US 6,419,594 B1
(45) Date of Patent: *Jul. 16, 2002

(54) DISTANCE MULTI-LAYER GOLF BALL

(75) Inventors: R. Dennis Nesbitt, Westfield; Mark L. Binette, Ludlow, both of MA (US); Michael J. Sullivan, Old Lyme, CT (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/523,561

(22) Filed: Mar. 10, 2000

Related U.S. Application Data

(63) Continuation-in-part of application No. 09/248,016, filed on Feb. 10, 1999, now Pat. No. 6,258,302, which is a continuation-in-part of application No. 09/226,340, filed on Jan. 6, 1999, now Pat. No. 6,277,920, which is a continuation-in-part of application No. 09/226,727, filed on Jan. 7, 1999, which is a continuation-in-part of application No. 08/920,070, filed on Aug. 26, 1997, now Pat. No. 6,224,498, which is a continuation of application No. 08/542,793, filed on Oct. 13, 1995, now abandoned, which is a continuation-in-part of application No. 08/070,510, filed on Jun. 1, 1993, now abandoned.

(51) Int. Cl.[7] .......................... A63B 37/06; A63B 37/04; A63B 37/12; A63B 37/14
(52) U.S. Cl. ...................... 473/371; 473/373; 473/374; 473/370; 473/378; 473/376
(58) Field of Search ................................. 473/351, 365, 473/367, 368, 370, 371, 372, 373, 374, 376, 377, 378

(56) References Cited

U.S. PATENT DOCUMENTS

| | | |
|---|---|---|
| 3,421,766 A | 1/1969 | Chmiel et al. |
| 3,432,165 A | 3/1969 | Haines et al. |
| 3,478,132 A | 11/1969 | Randolph |
| 3,572,721 A | 3/1971 | Harrison et al. |
| 3,883,145 A | 5/1975 | Cox et al. |
| 4,076,255 A | 2/1978 | Moore |
| 4,082,288 A | 4/1978 | Martin et al. |
| 4,264,075 A | 4/1981 | Miller et al. |
| 4,266,772 A | 5/1981 | Martin et al. |
| 4,274,637 A | 6/1981 | Molitor |
| 4,328,133 A | 5/1982 | Ogawa et al. |
| 4,431,193 A | 2/1984 | Nesbitt |
| 4,683,257 A | 7/1987 | Kakiuchi et al. |

(List continued on next page.)

FOREIGN PATENT DOCUMENTS

| | | |
|---|---|---|
| CA | 674595 | 11/1963 |
| CA | 713631 | 7/1965 |
| GB | 963380 | 6/1978 |
| GB | 2 167 309 A | 5/1986 |
| JP | 91059931 | 9/1991 |
| WO | WO 00/40303 | 7/2000 |
| WO | WO 01/10510 A1 | 2/2001 |

*Primary Examiner*—Paul T. Sewell
*Assistant Examiner*—Alvin A. Hunter, Jr.

(57) ABSTRACT

The present invention is directed to an improved multi-layer golf ball comprising a core, an inner cover layer and an outer cover layer. The core preferably includes at least one metallic filler material. The inner cover layer is comprised of a low acid ionomer blend which may or may not include a filler such as zinc stearate. The outer cover layer is comprised of a soft, very low modulus ionomer or ionomer blend, or a non-ionomeric thermoplastic elastomer such as polyurethane, polyester or polyetheramide. The golf ball may further comprise an optional mantle layer, which may also include one or more filler materials. The resulting multi-layered golf ball of the present invention provides for enhanced distance without sacrificing playability or durability when compared to known multi-layer golf balls.

134 Claims, 2 Drawing Sheets

U.S. PATENT DOCUMENTS

| | | |
|---|---|---|
| 4,696,475 A | 9/1987 | Tomita et al. |
| 4,721,749 A | 1/1988 | Odar |
| 4,726,590 A | 2/1988 | Molitor |
| 4,838,556 A | 6/1989 | Sullivan |
| 4,844,471 A | 7/1989 | Terence |
| 4,852,884 A | 8/1989 | Sullivan |
| 4,884,814 A | 12/1989 | Sullivan |
| 4,911,451 A | 3/1990 | Sullivan |
| 4,919,434 A | 4/1990 | Sullivan |
| 4,929,678 A | 5/1990 | Hamada |
| 4,931,376 A | 6/1990 | Hattori et al. |
| 4,955,613 A | 9/1990 | Gendreau et al. |
| 4,974,852 A | 12/1990 | Hiraoka et al. |
| 4,984,803 A | 1/1991 | Llort et al. |
| 4,986,545 A | 1/1991 | Sullivan |
| 5,068,151 A | 11/1991 | Nakamura |
| 5,082,285 A | 1/1992 | Hamada et al. |
| 5,098,105 A | 3/1992 | Sullivan |
| 5,120,791 A | 6/1992 | Sullivan |
| 5,131,662 A | 7/1992 | Pollitt |
| 5,187,013 A | 2/1993 | Sullivan |
| 5,209,485 A | 5/1993 | Nesbitt et al. |
| 5,215,308 A | 6/1993 | Hiraska et al. |
| 5,306,760 A | 4/1994 | Sullivan |
| 5,312,857 A | 5/1994 | Sullivan |
| 5,314,187 A | 5/1994 | Proudfit |
| 5,324,783 A | 6/1994 | Sullivan |
| 5,328,959 A | 7/1994 | Sullivan |
| 5,330,837 A | 7/1994 | Sullivan |
| 5,338,610 A | 8/1994 | Sullivan |
| RE35,293 E | 7/1996 | Hiraoka et al. |
| 5,542,677 A | 8/1996 | Sullivan et al. |
| 5,548,045 A | 8/1996 | Goto |
| 5,553,852 A | 9/1996 | Higuchi et al. |
| 5,580,057 A | 12/1996 | Sullivan et al. |
| 5,585,440 A | 12/1996 | Yamada et al. |
| 5,591,803 A | 1/1997 | Sullivan et al. |
| 5,691,429 A | 11/1997 | Van Der Arend |
| 5,733,206 A | 3/1998 | Nesbitt et al. |
| 5,779,562 A * | 7/1998 | Melvin et al. ............. 473/373 |
| 5,879,244 A | 3/1999 | Hwang |
| 5,905,125 A | 5/1999 | Tsujimoto |
| 6,224,498 B1 | 5/2001 | Sullivan |
| 6,258,302 B1 * | 7/2001 | Nesbitt .................... 264/40.1 |
| 6,267,693 B1 * | 7/2001 | Sullivan ................... 473/372 |
| 6,277,921 B1 * | 8/2001 | Sullivan ................. 525/330.2 |
| 6,315,684 B1 * | 11/2001 | Binette et al. ............ 473/377 |

* cited by examiner

DISTANCE MULTI-LAYER GOLF BALL

CROSS REFERENCES TO RELATED APPLICATIONS

This application is a continuation-in-part application of U.S. application Ser. No. 08/920,070 filed on Aug. 26, 1997 now U.S. Pat. No. 6,224,498 which in turn is a continuation of U.S. application Ser. No. 08/542,793 filed Oct. 13, 1995, now abandoned, which is a continuation-in-part of U.S. application Ser. No. 08/070,510 filed on Jun. 1, 1993, now abandoned. This application is also a continuation-in-part of U.S. applications Ser. No. 09/248,016 filed on Feb. 10, 1999; now U.S. Pat. No. 6,258,302 Ser. No. 09/226,340 filed on Jan. 6, 1999; now U.S. Pat. No. 6,277,920 and Ser. No. 09/226,727 filed on Jan. 7, 1999.

FIELD OF THE INVENTION

The present invention relates to golf balls and, more particularly, to improved standard and oversized golf balls comprising multi-layer covers which have a comparatively hard inner layer and a relatively soft outer layer. The golf balls also feature the use of improved core formulations and optimized dimple patterns. The improved multi-layer golf balls provide for enhanced distance and durability properties over single layer cover golf balls while at the same time offering enhanced "feel" and spin characteristics generally associated with soft balata and balata-like covers of the prior art.

BACKGROUND OF THE INVENTION

Traditional golf ball covers have been comprised of balata or blends of balata with elastomeric or plastic materials. The traditional balata covers are relatively soft and flexible. Upon impact, the soft balata covers compress against the surface of the club producing high spin. Consequently, the soft and flexible balata covers provide an experienced golfer with the ability to apply a spin to control the ball in flight in order to produce a draw or a fade, or a backspin which causes the ball to "bite" or stop abruptly on contact with the green. Moreover, the soft balata covers produce a soft "feel" to the low handicap player. Such playability properties (workability, feel, etc.) are particularly important in short iron play with low swing speeds and are exploited significantly by relatively skilled players.

Despite all the benefits of balata, balata covered golf balls are easily cut and/or damaged if mis-hit. Golf balls produced with balata or balata-containing cover compositions therefore have a relatively short lifespan.

As a result of this negative property, balata and its synthetic substitutes, trans-polyisoprene and trans-polybutadiene, have been essentially replaced as the cover materials of choice by new cover materials comprising ionomeric resins.

Ionomeric resins are polymers containing interchain ionic bonding. As a result of their toughness, durability and flight characteristics, various ionomeric resins sold by E. I. DuPont de Nemours & Company under the trademark "Surlyn®" and more recently, by the Exxon Corporation (see U.S. Pat. No. 4,911,451) under the trademarks "Escor®" and the trade name "Iotek", have become the materials of choice for the construction of golf ball covers over the traditional "balata" (trans-polyisoprene, natural or synthetic) rubbers. As stated, the softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic group in the copolymer resulting in a thermoplastic elastomer exhibiting enhanced properties, i.e. durability, etc., for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

As a result, while there are currently more than fifty (50) commercial grades of ionomers available both from DuPont and Exxon, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting not only the improved impact resistance and carrying distance properties produced by the "hard" ionomeric resins, but also the playability (i.e., "spin", "feel", etc.) characteristics previously associated with the "soft" balata covers, properties which are still desired by the more skilled golfer.

Consequently, a number of two-piece (a solid resilient center or core with a molded cover) and three-piece (a liquid or solid center, elastomeric winding about the center, and a molded cover) golf balls have been produced by the present inventors and others to address these needs. The different types of materials utilized to formulate the cores, covers, etc. of these balls dramatically alters the balls' overall characteristics.

In addition, multi-layered covers containing one or more ionomer resins have also been formulated in an attempt to produce a golf ball having the overall distance, playability and durability characteristics desired. For example, this was addressed by Spalding Sports Worldwide, Inc., the assignee of the present invention, in U.S. Pat. No. 4,431,193 where a multi-layered regular sized, golf ball is disclosed.

In the '193 patent, a multi-layer golf ball is produced by initially molding a first cover layer on a spherical core and then adding a second layer. The first layer is comprised of a hard, high flexural modulus resinous material such as type 1605 Surlyn® (now designated Surlyn® 8940). Type 1605 Surlyn® (Surlyn® 8940) is a sodium ion based low acid (less than or equal to 15 weight percent methacrylic acid) ionomer resin having a flexural modulus of about 51,000 psi. An outer layer of a comparatively soft, low flexural modulus resinous material such as type 1855 Surlyn® (now designated Surlyn® 9020) is molded over the inner cover layer. Type 1855 Surlyn® (Surlyn® 9020) is a zinc ion based low acid (10 weight percent methacrylic acid) ionomer resin having a flexural modulus of about 14,000 psi.

The '193 patent teaches that the hard, high flexural modulus resin which comprises the first layer provides for a gain in coefficient of restitution over the coefficient of restitution of the core. The increase in the coefficient of restitution provides a ball which serves to attain or approach the maximum initial velocity limit of 255 feet per second as provided by the United States Golf Association (U.S.G.A.) rules. The relatively soft, low flexural modulus outer layer provides essentially no gain in the coefficient of restitution but provides for the advantageous "feel" and playing characteristics of a balata covered golf ball. Unfortunately, however, while a ball of the '193 patent does exhibit enhanced playability characteristics with improved distance (i.e. enhanced C.O.R. values) over a number of other then known multi-layered balls, the ball suffers from poor cut resistance and relatively short distance (i.e. lower C.O.R. values) when compared to two-piece, single cover layer balls commercially available today. These undesirable properties make the ball produced in accordance with the '193 patent unacceptable by today's standards.

The present invention is directed to new multi-layer golf ball compositions which provide for enhanced coefficient of restitution (i.e, enhanced resilience or carrying distance) and/or durability properties when compared to the multilayer balls found in the prior art, as well as improved outer cover layer softness and durability. As such, the playability characteristics (i.e., "feel", "click", "spin", etc.) are not diminished.

These and other objects and features of the invention will be apparent from the following summary and description of the invention, the drawings and from the claims.

SUMMARY OF THE INVENTION

In a first aspect, the present invention provides a golf ball comprising a core formed from a composition that includes two particular types of polybutadiene and a metallic filler material that serves to increase the density of the core. The first polybutadiene is polymerized in the presence of a cobalt or nickel based catalyst and exhibits a Mooney viscosity, prior to curing, of from about 65 to 85. The second polybutadiene is polymerized in the presence of a neodymium or lanthanide series catalyst. The golf ball further comprises an inner cover layer molded about the core, and an outer cover layer molded on the inner cover layer. The inner cover layer comprises a particular high acid ionomer. And, the outer cover layer comprises a relatively soft polymeric material.

In another aspect, the present invention provides a golf ball comprising a core formed from a particular composition that includes two particular types of polybutadiene in combination with at least one metallic filler material that serves to increase the density of the core. One of the polybutadienes is synthesized in the presence of a cobalt or nickel catalyst, and, prior to curing, exhibits a Mooney viscosity of from about 65 to 85. The other polybutadiene is synthesized in the presence of a neodymium or lanthanide series catalyst. The particular core composition utilizes a particular weight ratio of from about 80 parts to about 120 parts by weight of elastomer components, to at least about 60 parts by weight of non-elastomer components, including the metallic filler material. The golf ball further comprises an inner cover layer molded on the resulting core, and an outer cover layer molded on the inner cover layer. Both the inner cover layer and the outer cover layer comprise particular materials.

In yet another aspect, the present invention provides a golf ball comprising a core formed from a composition that includes a first polybutadiene which is synthesized in the presence of a cobalt or nickel catalyst and, prior to curing, exhibits a polydispersity of from about 1.9 to about 3.9 and a Mooney viscosity of from about 65 to about 85, and a second polybutadiene which is synthesized in the presence of a neodymium or lanthanide series catalyst. The core composition further comprises a metallic filler material. In this aspect, the golf ball further comprises an inner cover layer molded on the core, the inner cover layer comprising a high acid ionomer. And, the golf ball further comprises an outer cover layer molded on the inner cover layer, wherein the outer cover layer comprises a particular material.

The present invention also provides a golf ball comprising a core formed from a composition that includes polybutadiene and at least one metallic filler material. The polybutadiene consists essentially of a solid polybutadiene and, which prior to curing, has a Mooney viscosity of greater than 70 and a polydispersity of less than 4. The golf ball further comprises an inner cover layer molded on the core, and an outer cover layer molded on the inner cover layer.

In yet another aspect, the present invention provides a golf ball comprising a core formed from a composition that includes from about 80 parts to about 120 parts by weight of elastomer components and at least 60 parts by weight of nonelastomer components. The elastomer components include a polybutadiene which consists essentially of a solid polybutadiene, and which prior to curing, exhibits a Mooney viscosity of from about 73 to 85 and a polydispersity of about 1.9 to about 3.9. The nonelastomer components include a metallic filler material. The golf ball further comprises an inner cover layer molded about the core which includes a high acid ionomer. And, the present invention further comprises an outer cover layer molded on the inner cover layer, wherein the outer cover layer comprises a relatively soft material.

In yet a further aspect of the present invention, a golf ball is provided which comprises a core formed from a composition that includes a solid polybutadiene, a crosslinking agent, a metal salt, zinc oxide and a metallic filler material. The polybutadiene, prior to curing of the core, has a polydispersity of from about 1.9 to about 3.9 and a Mooney viscosity of more than 70. The golf ball further comprises inner and outer cover layers molded about the core.

The present invention also provides methods for forming the noted golf balls. In one aspect, a method for producing a golf ball is provided by combining a first polybutadiene having a Mooney viscosity of from about 65 to about 85 and a polydispersity of from about 1.9 to about 3.9, with a second polybutadiene synthesized in the presence of a neodymium or lanthanide series catalyst to form a core composition, and further combining such with at least one metallic filler material. The core composition is then molded to form a golf ball core. An inner cover layer is then formed about the core, and an outer cover layer is formed on the inner cover layer to produce the resulting golf ball.

The present invention further provides a method for producing a golf ball comprising combining a solid polybutadiene having a Mooney viscosity of from about 73 to about 85 and a polydispersity of from about 1.9 to about 3.9, with a metallic filler material and at least one other component to form a core composition. The method further comprises molding the core composition to form a golf ball core. Then, inner and outer cover layers are formed about the intermediate ball to form the resulting golf ball.

These and other objects and features of the invention will be apparent from the following detailed description.

DETAILED DESCRIPTION OF THE PREFERRED EMBODIMENTS

Figure 1:
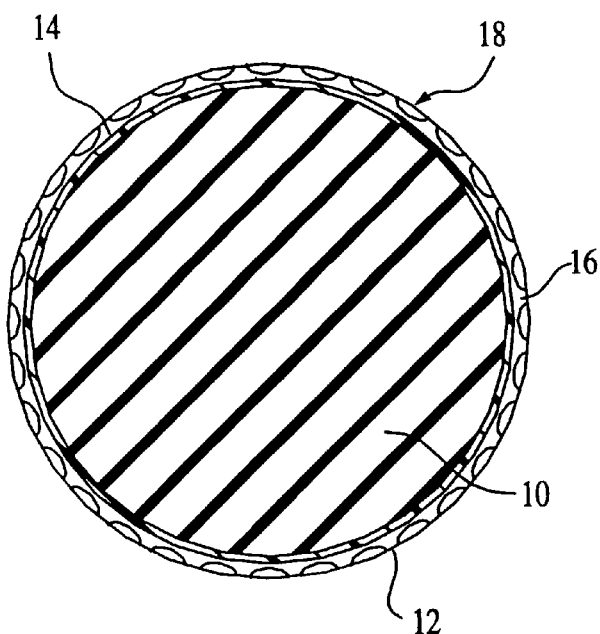
FIG. 1 is a cross-sectional view of a preferred embodiment golf ball according to the present invention illustrating a core 10 and a cover 12 consisting of an inner layer 14 and an outer layer 16 having dimples 18.

The present invention is directed to improved multi-layer golf ball compositions and the resulting multi-layer golf balls produced using the improved compositions. The novel multi-layer golf ball covers of the present invention include a first or inner layer or ply of a high acid (greater than 16 weight percent acid) ionomer blend or, more preferably, a low acid (16 weight percent acid or less) ionomer blend and second or outer layer or ply comprised of a comparatively softer, low modulus ionomer, ionomer blend or other non-ionomeric thermoplastic elastomer such as polyurethane, a polyester elastomer. The multi-layer golf balls of the invention can be of standard or enlarged size. Preferably, the inner layer or ply includes a blend of low acid ionomers and has a Shore D hardness of 60 or greater and the outer cover layer includes a blend of hard and soft low acid (i.e. 16 weight percent acid or less) ionomers and has a Shore D hardness of about 64 less.

It has been found that multi-layer golf balls having inner and outer cover layers exhibit higher C.O.R. values and have greater travel distance in comparison with balls made from a single cover layer. In addition, it has been found that use of an inner cover layer constructed of a blend of low acid (i.e., 16 weight percent acid or less) ionomer resins produces softer compression and higher spin rates than inner cover layers constructed of high acid ionomer resins. This is compounded by the fact that the softer outer layer adds to the desirable "feel" and high spin rate while maintaining respectable resiliency. The soft outer layer allows the cover to deform more during impact and increases the area of contact between the club face and the cover, thereby imparting more spin on the ball. As a result, the soft cover provides the ball with a balata-like feel and playability characteristics with improved distance and durability.

Consequently, the overall combination of inner and outer cover layers made from blends of low acid ionomer resins results in a standard size or oversized golf ball having enhanced resilience (improved travel distance) and durability (i.e. cut resistance, etc.) characteristics while maintaining and in many instances, improving the ball's playability properties.

The combination of a low acid ionomer blend inner cover layer with a soft, relatively low modulus ionomer, ionomer blend or other non-ionomeric thermoplastic elastomer outer cover layer provides for good overall coefficient of restitution (i.e., enhanced resilience) while at the same time demonstrating improved compression and spin. While some improvement in resiliency is also produced by the outer cover layer, the outer cover layer generally contributes to a more desirable feel and spin, particularly at lower swing speeds with highly lofted clubs such as half wedge shots.

Two principal properties involved in golf ball performance are resilience and hardness. Resilience is determined by the coefficient of restitution (C.O.R.), the constant "e" which is the ratio of the relative velocity of two elastic spheres after direct impact to that before impact. As a result, the coefficient of restitution ("e") can vary from 0 to 1, with 1 being equivalent to an elastic collision and 0 being equivalent to an inelastic collision.

Resilience (C.O.R.), along with additional factors such as club head speed, angle of trajectory and ball configuration (i.e., dimple pattern) generally determine the distance a ball will travel when hit. Since club head speed and the angle of trajectory are factors not easily controllable by a manufacturer, factors of concern among manufacturers are the coefficient of restitution (C.O.R.) and the surface configuration of the ball.

The coefficient of restitution (C.O.R.) in solid core balls is a function of the composition of the molded core and of the cover. In balls containing a wound core (i.e., balls comprising a liquid or solid center, elastic windings, and a cover), the coefficient of restitution is a function of not only the composition of the center and cover, but also the composition and tension of the elastomeric windings. Although both the core and the cover contribute to the coefficient of restitution, the present invention is directed to the enhanced coefficient of restitution (and thus travel distance) which is affected by the cover composition.

In this regard, the coefficient of restitution of a golf ball is generally measured by propelling a ball at a given speed against a hard surface and measuring the ball's incoming and outgoing velocity electronically. As mentioned above, the coefficient of restitution is the ratio of the outgoing velocity to the incoming velocity. The coefficient of restitution must be carefully controlled in all commercial golf balls in order for the ball to be within the specifications regulated by the United States Golf Association (U.S.G.A.). Along this line, the U.S.G.A. standards indicate that a "regulation" ball cannot have an initial velocity (i.e., the speed off the club) exceeding 255 feet per second. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

The hardness of the ball is the second principal property involved in the performance of a golf ball. The hardness of the ball can affect the playability of the ball on striking and the sound or "click" produced. Hardness is determined by the deformation (i.e., compression) of the ball under various load conditions applied across the ball's diameter (i.e., the lower the compression value, the harder the material). As indicated in U.S. Pat. No. 4,674,751, softer covers permit the accomplished golfer to impart proper spin. This is because the softer covers deform on impact significantly more than balls having "harder" ionomeric resin covers. As a result, the better player is allowed to impart fade, draw or backspin to the ball thereby enhancing playability. Such properties may be determined by various spin rate tests such as the "nine iron" spin rate test described below in the Examples.

Accordingly, the present invention is directed to an improved multi-layer cover which produces, upon molding each layer around a core (preferably a solid core) to formulate a multi-layer cover, a golf ball exhibiting enhanced distance (i.e., resilience) without adversely affecting, and in many instances, improving the ball's playability (hardness/softness) and/or durability (i.e., cut resistance, fatigue resistance, etc.) characteristics.

Figure 2:
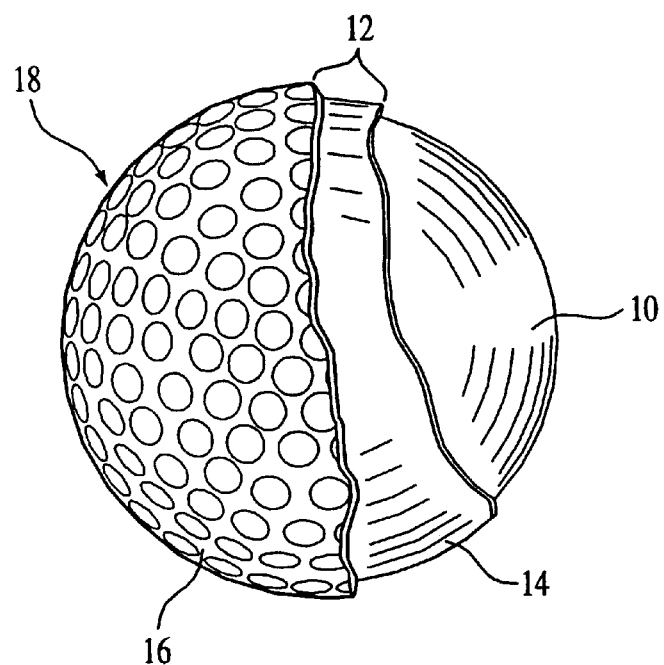
FIG. 2 is another view of a golf ball of the invention having a core 10 and a cover 12 made of an inner layer 14 and an outer layer 16 having dimples 18.

The present invention relates to improved multi-layer golf balls, particularly a golf ball as shown in FIGS. 1 and 2, comprising a multi-layered cover 12 over a solid core 10, and method for making same.

In a most preferred aspect of the invention, a multi-layer cover golf ball having a solid (one or more layers of thermoplastic or thermoset polymer), liquid, hollow or wound core and meeting U.S.G.A. conformance, that is longer in high speed drive, distance than current Strata™ golf balls is provided. This most preferred golf ball has an outer cover hardness of less than 65 Shore D preferably 55 to 64, and most preferably 60 to 61D; a mantle hardness of greater than 65D, preferably greater than 67D, and is comprised of high-acid ionomer. The mantle and/or outer cover may contain a density modifying filler, fiber or additive. The core is preferably cross-linked diene rubber as described herein and has a C.O.R. of 0.780.

The most preferred ball has a size of 1.680 inches in diameter to 1.800 and preferably is about 1.680 to 1.687. The ball compression is PGA 60 to 110, and preferably 80 to 100. The ball has a C.O.R. of at least 0.780, preferably at least 0.790 and most preferably at least 0.800. The ball has a natural frequency of a quantity less than prior art hard covered 2-piece balls but higher than current Strata Tour™ or Aero™ golf balls. The ball also (but not necessarily) preferably has a non-circular dimple pattern for reduced coefficient of drag.

The keys to the most preferred ball's improved distance are (1) a resilient cover of a hardness that does not contribute excessive spin; (2) an improved core formulation utilizing a metallic filler material, high molecular weight polybutadiene, optimized peroxide type and level, and little or no ground flash; and (3) an improved, optimized dimple pattern.

The cover, mantle and core of the ball may also be crosslinked (after molding) using high energy radiation, such as gamma or electron beam.

Other critical parameters, such as specific gravity of various components, exact chemical compositions, wall thicknesses, spin rates, etc. are described in greater detail herein.

Cover Assembly

Referring to the referenced figures, the multi-layered cover 12 comprises two layers: a first or inner layer or ply 14 and a second or outer layer or ply 16. The inner layer 14 is comprised of a low acid (i.e. 16 weight percent acid or less) ionomer blend. Preferably, the inner layer is comprised of a blend of two or more low acid (i.e. 16 weight percent acid or less) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball.

The low acid ionomers which may be suitable for use in formulating the inner layer compositions of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the low acid ionomer resins which may be included in the inner layer cover compositions of the invention contains 16% by weight or less of a carboxylic acid.

The inner layer compositions include the low acid ionomers such as those developed and sold by E. I. DuPont de Nemours & Company under the trademark "Surlyn®" and by Exxon Corporation under the trademark "Escor®" or trade name "Iotek", or blends thereof.

The low acid ionomeric resins available from Exxon under the designation "Escor®" and or "Iotek", are somewhat similar to the low acid ionomeric resins available under the "Surlyn®" trademark. However, since the Escor®/Iotek ionomeric resins are sodium or zinc salts of poly(ethylene-acrylic acid) and the "Surlyn®" resins are zinc, sodium, magnesium, etc. salts of poly(ethylene-methacrylic acid), distinct differences in properties exist.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc high acid ionomers, are processed to produce the covers of multi-layered golf balls, (i.e., the inner cover layer herein) the resulting golf balls will travel further and at an enhanced spin rate than previously known multi-layered golf balls. Such an improvement is particularly noticeable in enlarged or over-sized golf balls.

For example, the normal size, multi-layer golf ball taught in U.S. Pat. No. 4,650,193 does not incorporate blends of low acid ionomeric resins of the present invention in the inner cover layer. In addition, the multi-layered ball disclosed in the '193 patent suffers substantially in durability in comparison with the present invention.

Furthermore, as shown in the Examples, use of a inner layer formulated from blends of lower acid ionomers produces multi-layer golf balls having enhanced compression and spin rates. These are the properties desired by the more skilled golfer.

With respect to the outer layer 16 of the multi-layered cover of the present invention, the outer cover layer is comparatively softer than the low acid ionomer blend based inner layer. The softness provides for the enhanced feel and playability characteristics typically associated with balata or balata-blend balls. The outer layer or ply is comprised of a relatively soft, low modulus (about 1,000 psi to about 10,000 psi) and low acid (less than 16 weight percent acid) ionomer, ionomer blend or a non-ionomeric thermoplastic elastomer such as, but not limited to, a polyurethane, a polyester elastomer such as that marketed by DuPont under the trademark Hytrel®, or a polyether amide such as that marketed by Elf Atochem S.A. under the trademark Pebax®. The outer layer is fairly thin (i.e. from about 0.010 to about 0.070 in thickness, more desirably 0.03 to 0.06 inches in thickness for a 1.680 inch ball and 0.04 to 0.07 inches in thickness for a 1.72 inch ball), but thick enough to achieve desired playability characteristics while minimizing expense.

Preferably, the outer layer includes a blend of hard and soft (low acid) ionomer resins such as those described in U.S. Pat. Nos. 4,884,814 and 5,120,791, both incorporated herein by reference. Specifically, a desirable material for use in molding the outer layer comprises a blend of a high modulus (hard), low acid, ionomer with a low modulus (soft), low acid, ionomer to form a base ionomer mixture. A high modulus ionomer herein is one which measures from about 15,000 to about 70,000 psi as measured in accordance with ASTM method D-790. The hardness may be defined as at least 50 on the Shore D scale as measured in accordance with ASTM method D-2240.

A low modulus ionomer suitable for use in the outer layer blend has a flexural modulus measuring from about 1,000 to about 10,000 psi, with a hardness of about 20 to about 40 on the Shore D scale.

The hard ionomer resins utilized to produce the outer cover layer composition hard/soft blends include ionic copolymers which are the sodium, zinc, magnesium or lithium salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and either acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the outer layer blends for use in the present invention. In addition, various blends of "Iotek" and Surlyn® hard ionomeric resins, as well as other available ionomeric resins, may be utilized in the present invention in a similar manner.

Examples of commercially available hard ionomeric resins which may be used in the present invention in formulating the inner and outer cover blends include the hard sodium ionic copolymer sold under the trademark Surlyn®8940 and the hard zinc ionic copolymer sold under the trademark Surlyn®9910. Surlyn®8940 is a copolymer of ethylene with methacrylic acid and about 15 weight percent acid which is about 29 percent neutralized with sodium ions. This resin has an average melt flow index of about 2.8. Surlyn®9910 is a copolymer of ethylene and methacrylic acid with about 15 weight percent acid which is about 58 percent neutralized with zinc ions. The average melt flow index of Surlyn®9910 is about 0.7. The typical properties of Surlyn®9910 and 8940 are set forth below in Table 1:

TABLE 1

Typical Properties of Commercially Available Hard Surlyn ® Resins
Suitable for Use in the Inner and Outer Layer Blends of the Present Invention

|  | ASTM D | 8940 | 9910 | 8920 | 9528 | 9970 | 9730 |
|---|---|---|---|---|---|---|---|
| Cation Type |  | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm$^3$ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi) MPa | D-790 | (51) 350 | (48) 330 | (55) 380 | (32) 220 | (28) 190 | (30) 210 |
| Tensile Impact (23° C.) KJ/m$_2$ (ft. – lbs./in$^2$) |  | 1020 (485) | 1020 (485) | 865 (410) | 1160 (550) | 760 (360) | 1240 (590) |
| Vicat Temperature, ° C. | D-1525 | 63 | 62 | 58 | 73 | 61 | 73 |

Examples of the more pertinent acrylic acid based hard ionomer resin suitable for use in the present inner and outer cover composition sold under the "Iotek" tradename by the Exxon Corporation include Iotek 4000, Iotek 4010, Iotek 8000, Iotek 8020 and Iotek 8030. The typical properties of these and other Iotek hard ionomers suited for use in formulating the inner and outer layer cover compositions are set forth below in Table 2:

TABLE 2

Typical Properties of Iotek Ionomers

|  | ASTM Method | Units | 4000 | 4010 | 8000 | 8020 | 8030 |
|---|---|---|---|---|---|---|---|
| Resin Properties |  |  |  |  |  |  |  |
| Cation type |  |  | zinc | zinc | sodium | sodium | sodium |
| Melt index | D-1238 | g/10 min. | 2.5 | 1.5 | 0.8 | 1.6 | 2.8 |
| Density | D-1505 | kg/m$^3$ | 963 | 963 | 954 | 960 | 960 |
| Melting Point | D-3417 | ° C. | 90 | 90 | 90 | 87.5 | 87.5 |
| Crystallization Point | D-3417 | ° C. | 62 | 64 | 56 | 53 | 55 |
| Vicat Softening Point | D-1525 | ° C. | 62 | 63 | 61 | 64 | 67 |

TABLE 2-continued

| | | | | | | | |
|---|---|---|---|---|---|---|---|
| % Weight Acrylic Acid | | | | 16 | | 11 | |
| % of Acid Groups cation neutralized | | | | 30 | 40 | | |
| Plaque Properties | | | | | | | |
| (3 mm thick, compression molded) | | | | | | | |
| Tensile at break | | D-638 | MPa | 24 | 26 | 36 | 31.5 | 28 |
| Yield point | | D-638 | MPa | none | none | 21 | 21 | 23 |
| Elongation at break | | D-638 | % | 395 | 420 | 350 | 410 | 395 |
| 1% Secant modulus | | D-638 | MPa | 160 | 160 | 300 | 350 | 390 |
| Shore Hardness D | | D-2240 | — | 55 | 55 | 61 | 58 | 59 |
| Film Properties (50 micron film | | | | | | | | |
| 2.2:1 Blow-up ratio) | | | | | | | | |
| Tensile at Break | MD | D-882 | MPa | 41 | 39 | 42 | 52 | 47.4 |
| | TD | D-882 | MPa | 37 | 38 | 38 | 38 | 40.5 |
| Yield point | MD | D-882 | MPa | 15 | 17 | 17 | 23 | 21.6 |
| | TD | D-882 | MPa | 14 | 15 | 15 | 21 | 20.7 |
| Elongation at Break | MD | D-882 | % | 310 | 270 | 260 | 295 | 305 |
| | TD | D-882 | % | 360 | 340 | 280 | 340 | 345 |
| 1% Secant modulus | MD | D-882 | MPa | 210 | 215 | 390 | 380 | 380 |
| | TD | D-882 | MPa | 200 | 225 | 380 | 350 | 345 |
| Dart Drop Impact | | D-1709 | g/micron | 12.4 | 12.5 | 20.3 | | |

| | ASTM Method | Units | 7010 | 7020 | 7030 |
|---|---|---|---|---|---|
| Resin Properties | | | | | |
| Cation type | | | zinc | zinc | zinc |
| Melt Index | D-1238 | g/10 min. | 0.8 | 1.5 | 2.5 |
| Density | D-1505 | kg/m$^3$ | 960 | 960 | 960 |
| Melting Point | D-3417 | ° C. | 90 | 90 | 90 |
| Crystallization Point | D-3417 | ° C. | — | — | — |
| Vicat Softening Point | D-1525 | ° C. | 60 | 63 | 62.5 |
| % Weight Acrylic Acid | | | — | — | — |
| % of Acid Groups Cation Neutralized | | | — | — | — |
| Plaque Properties | | | | | |
| (3 mm thick, compression molded) | | | | | |
| Tensile at break | D-638 | MPa | 38 | 38 | 38 |
| Yield Point | D-638 | MPa | none | none | none |
| Elongation at break | D-638 | % | 500 | 420 | 395 |
| 1% Secant modulus | D-638 | MPa | — | — | — |
| Shore Hardness D | D-2240 | — | 57 | 55 | 55 |

Comparatively, soft ionomers are used in formulating the hard/soft blends of the inner and outer cover compositions. These ionomers include acrylic acid based soft ionomers. They are generally characterized as comprising sodium or zinc salts of a terpolymer of an olefin having from about 2 to 8 carbon atoms, acrylic acid, and an unsaturated monomer of the acrylate ester class having from 1 to 21 carbon atoms. The soft ionomer is preferably a zinc based ionomer made from an acrylic acid base polymer in an unsaturated monomer of the acrylate ester class. The soft (low modulus) ionomers have a hardness from about 20 to about 40 as measured on the Shore D scale and a flexural modulus from about 1,000 to about 10,000, as measured in accordance with ASTM method D-790.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the inner and outer cover layers. The combination produces higher C.O.R.s at equal or softer hardness, higher melt flow (which corresponds to improved, more efficient molding, i.e., fewer rejects) as well as significant cost savings versus the inner and outer layers of multi-layer balls produced by other known hard-soft ionomer blends as a result of the lower overall raw materials costs and improved yields.

While the exact chemical composition of the resins to be sold by Exxon under the designation Iotek 7520 is considered by Exxon to be confidential and proprietary information, Exxon's experimental product data sheet lists the following physical properties of the ethylene acrylic acid zinc ionomer developed by Exxon:

TABLE 3

| Property | ASTM Method | Units | Typical Value |
|---|---|---|---|
| Physical Properties of Iotek 7520 | | | |
| Melt Index | D-1238 | g/10 min. | 2 |
| Density | D-1505 | kg/m$^3$ | 0.962 |
| Cation | | | Zinc |
| Melting Point | D-3417 | ° C. | 66 |
| Crystallization Point | D-3417 | ° C. | 49 |
| Vicat Softening Point | D-1525 | ° C. | 42 |
| Plaque Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |

TABLE 3-continued

| Property | ASTM Method | Units | Typical Value |
|---|---|---|---|
| Zwick Rebond | ISO 4862 | % | 52 |
| De Mattia Flex Resistance | D-430 | Cycles | >5000 |

In addition, test data indicates that Iotek 7520 resins have Shore D hardnesses of about 32 to 36 (per ASTM D-2240), melt flow indexes of 3±0.5 g/10 min (at 190° C. perASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, it has been found that a newly developed grade of an acrylic acid based soft ionomer available from the Exxon Corporation under the designation Iotek 7510, is also effective, when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn 8625 and the Surlyn 8629 combinations disclosed in U.S. Pat. No. 4,884,814).

In addition, Iotek 7510, when compared to Iotek 7520, produces slightly higher C.O.R. values at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpolymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The typical properties of Iotek 7510 in comparison of those of Iotek 7520 are set forth below:

TABLE 4

Physical Properties of Iotek 7510 in Comparison to Iotek 7520

|  | IOTEK 7520 | IOTEK 7510 |
|---|---|---|
| MI, g/10 min | 2.0 | 0.8 |
| Density, g/cc | 0.96 | 0.97 |
| Melting Point, ° F. | 151 | 149 |
| Vicat Softening Point, ° F. | 108 | 109 |
| Flex Modulus, psi | 3800 | 5300 |
| Tensile Strength, psi | 1450 | 1750 |
| Elongation, % | 760 | 690 |
| Hardness, Shore D | 32 | 35 |

It has been determined that when hard/soft ionomer blends are used for the outer cover layer, good results are achieved when the relative combination is in a range of about 90 to about 10 percent hard ionomer and about 10 to about 90 percent soft ionomer. The results are improved by adjusting the range to about 75 to 25 percent hard ionomer and 25 to 75 percent soft ionomer. Even better results are noted at relative ranges of about 60 to 90 percent hard ionomer resin and about 40 to 60 percent soft ionomer resin.

Specific formulations which may be used in the cover composition are included in the examples set forth in U.S. Pat. Nos. 5,120,791 and 4,884,814. The present invention is in no way limited to those examples.

Moreover, in alternative embodiments, the outer cover layer formulation may also comprise a soft, low modulus non-ionomeric thermoplastic elastomer including a polyester polyurethane such as B.F.Goodrich Company's Estane® polyester polyurethane X-4517. According to B.F. Goodrich, Estane® X-4517 has the following properties set forth in Table 5:

TABLE 5

Properties of Estane ® X-4517

| Tensile | 1430 |
|---|---|
| 100% | 815 |
| 200% | 1024 |
| 300% | 1193 |
| Elongation | 641 |
| Youngs Modulus | 1826 |
| Hardness A/D | 88/39 |
| Dayshore Rebound | 59 |
| Solubility in Water | Insoluble |
| Melt processing temperature | >350° F. (>177° C.) |
| Specific Gravity (water equals 1.0) | 1.1–1.3 |

Other soft, relatively low modulus non-ionomeric thermoplastic elastomers may also be utilized to produce the outer cover layer as long as the non-ionomeric thermoplastic elastomers produce the playability and durability characteristics desired without adversely effecting the enhanced spin characteristics produced by the low acid ionomer resin compositions. These include, but are not limited to thermoplastic polyurethanes such as Texin thermoplastic polyurethanes from Mobay Chemical Co. and the Pellethane thermoplastic polyurethanes from Dow Chemical Co.; ionomer/rubber blends such as those in Spalding U.S. Pat. Nos. 4,986,545; 5,098,105 and 5,187,013; and, Hytrel polyester elastomers from DuPont and pebax polyether amides from Elf Atochem S.A.

In preparing golf balls in accordance with the present invention, a hard inner cover layer is molded (by injection molding or by compression molding) about a core (preferably a solid core). A detailed description of other preferred cores is provided herein. A comparatively softer outer layer is molded over the inner layer.

The inner cover layer which is molded over the core is about 0.100 inches to about 0.010 inches in thickness, preferably about 0.0375 inches thick. The outer cover layer is about 0.010 inches to about 0.050 inches in thickness, preferably 0.0300 inches thick. Together, the core, the inner cover layer and the outer cover layer combine to form a ball having a diameter of 1.680 inches or more, the minimum diameter permitted by the rules of the United States Golf Association and weighing about 1.620 ounces.

Additional materials may be added to the cover compositions (both inner and outer cover layer) of the present invention including dyes (for example, Ultramarine Blue sold by Whitaker, Clark and Daniels of South Plainsfield, N.J.) (see U.S. Pat. No. 4,679,795); pigments such as titanium dioxide, zinc oxide, barium sulfate and zinc sulfate; and UV absorbers; antioxidants; antistatic agents; and stabilizers. Further, the cover compositions of the present invention may also contain softening agents, such as plasticizers, processing aids, etc. and reinforcing material such as glass fibers and inorganic fillers, as long as the desired properties produced by the golf ball covers are not impaired.

The various cover composition layers of the present invention may be produced according to conventional melt blending procedures. In the case of the outer cover layer, when a blend of hard and soft, low acid ionomer resins are utilized, the hard ionomer resins are blended with the soft ionomeric resins and with a master batch containing the desired additives in a Banbury mixer, two-roll mill, or extruder prior to molding. The blended composition is then formed into slabs and maintained in such a state until molding is desired. Alternatively, a simple dry blend of the pelletized or granulated resins and color master batch may be prepared and fed directly into the injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the low acid ionomer resin compositions used to produce the inner cover layer.

As previously noted, the preferred golf balls of the present invention utilize improved dimple patterns. These are set forth in detail in the following patents assigned to the same assignee as the present invention, Spalding Sports Worldwide, Inc.: U.S. Pat. Nos. Des. 401,986; Des. 401,979; 5,833,443; 5,772,532; 5,766,098; 5,735,756; 5,688,194; Des. 383,179; Des. 381,723; Des. 381,722; Des. 381,721; Des. 381,720; Des. 377,816; 5,588,924; Des. 375,339; 5,569,100; 5,507,493; 5,482,287; 5,482,286; and 5,470,075, all of which are hereby incorporated by reference.

Mantle Assembly and Filler Materials

The preferred embodiment golf ball may also comprise one or more mantle layers disposed between the previously described cover assembly and a core assembly described below.

Figure 3:
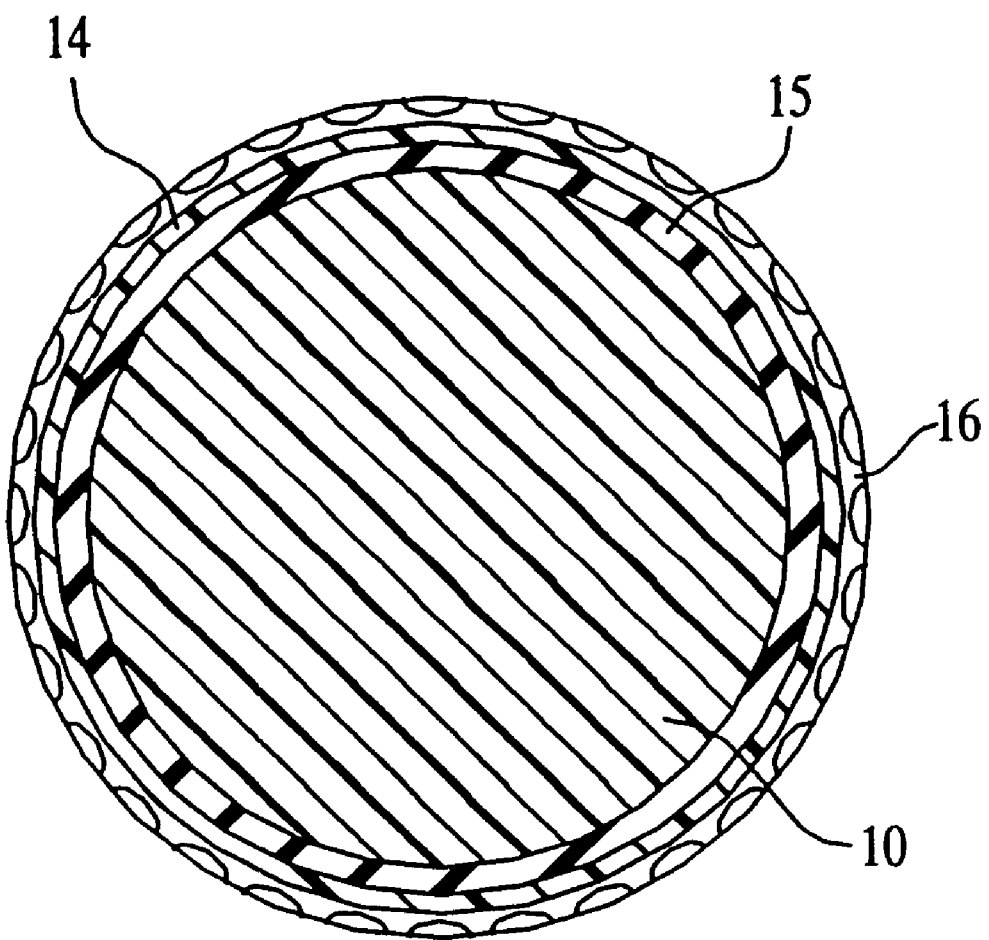
FIG. 3 is a cross-sectional view of another preferred embodiment golf ball in accordance with the present invention illustrating a core 10, a mantle 15, an inner cover layer 14, and an outer cover layer 16.

FIG. 3 illustrates another preferred embodiment golf ball in accordance with the present invention. That preferred ball comprises a core 10, at least one mantle layer 15 disposed about the core 10, an inner cover layer 14 disposed about the mantle layer 15, and an outer cover layer 16 disposed about the inner cover layer 14. The core 10 and cover layers 14, 16 are as described herein.

The mantle layer 15 may be formed from a wide array of materials including ionomers and/or non-ionomeric materials. Examples of non-ionomeric materials which are suitable for use in forming the mantle layer include, but are not limited to, low density polyethylene, linear low density polyethylene, high density polyethylene, polypropylene, rubber-toughened olefin polymers, acid copolymers which do not become part of an ionomeric copolymer when used in the inner cover layer, plastomers, flexomers, and thermoplastic elastomers such as styrenelbutadiene/styrene (SBS) or styrene/ethylene-butylene/styrene (SEBS) block copolymers, including Kraton® (Shell), dynamically vulcanized elastomers such as Santoprene® (Monsanto), ethylene vinyl acetates such as Elvax® (DuPont), ethylene methyl acrylates such as Optema® (Exxon), polyvinyl chloride resins, and other elastomeric materials may be used. It is desirable that the polyolefin be a tough, low density material. The non-ionomeric polyolefins can be mixed with ionomers.

The cover, mantle, and/or core may include fillers which include, but are not limited to, clay, talc, asbestos, graphite, glass, mica, calcium metasilicate, barium sulfate, zinc sulfide, aluminum hydroxide, silicates, diatomaceous earth, carbonates such as calcium carbonate, magnesium carbonate and the like, metals such as titanium, tungsten, aluminum, bismuth, nickel, molybdenum, iron, copper, brass, boron, bronze, cobalt and beryllium, and alloys of the above metals, metal oxides such as zinc oxide, iron oxide, aluminum oxide, titanium oxide, magnesium oxide, zirconium oxide and the like, particulate synthetic plastic such as high molecular weight polyethylene, polystyrene, polyethylene ionomer resins and the like, particulate carbonaceous materials such as carbon black, natural bitumen and the like, as well as cotton flock, cellulose flock, and leather fiber. Dark colored fillers generally are not preferred for use at the outer surface of the ball if a white ball is desired. The amount of filler employed is primarily a function of weight restrictions. For example, weight may be removed from the core and placed in the inner and/or outer cover. This added weight will change the moment of inertia of the ball thereby potentially altering performance.

Examples of various suitable heavy filler materials which can be included in the present invention are set forth in Table 6 as follows:

TABLE 6

| Filler Type | Spec. Grav. |
| --- | --- |
| graphite fibers | 1.5–1.8 |
| precipitated hydrated silica | 2.0 |
| clay | 2.62 |
| talc | 2.85 |
| asbestos | 2.5 |
| glass fibers | 2.55 |
| aramid fibers (Kevlar ®) | 1.44 |
| mica | 2.8 |
| calcium metasilicate | 2.9 |
| barium sulfate | 4.6 |
| zinc sulfide | 4.1 |
| silicates | 2.1 |
| diatomaceous earth | 2.3 |
| calcium carbonate | 2.71 |
| magnesium carbonate | 2.20 |
| Metals and Alloys (powders) | |
| titanium | 4.51 |
| tungsten | 19.35 |
| aluminum | 2.70 |
| bismuth | 9.78 |
| nickel | 8.90 |
| molybdenum | 10.2 |
| iron | 7.86 |
| copper | 8.94 |
| brass | 8.2–8.4 |
| boron | 2.364 |
| bronze | 8.70–8.74 |
| cobalt | 8.92 |
| beryllium | 1.84 |
| zinc | 7.14 |
| tin | 7.31 |
| Metal Oxides | |
| zinc oxide | 5.57 |
| iron oxide | 5.1 |
| aluminum oxide | 4.0 |
| titanium dioxide | 3.9–4.1 |
| magnesium oxide | 3.3–3.5 |
| zirconium oxide | 5.73 |
| Metal Stearates | |
| zinc stearate | 1.09 |
| calcium stearate | 1.03 |
| barium stearate | 1.23 |
| lithium stearate | 1.01 |

TABLE 6-continued

|  | Spec. Grav. |
| --- | --- |
| magnesium stearate | 1.03 |
| Particulate carbonaceous materials | |
| graphite | 1.5–1.8 |
| carbon black | 1.8 |
| natural bitumen | 1.2–1.4 |
| cotton flock | 1.3–1.4 |
| cellulose flock | 1.15–1.5 |
| leather fiber | 1.2–1.4 |

The amount and type of heavy weight filler material utilized is dependent upon the overall characteristics of the multi-layered golf ball desired. Generally, lesser amounts of high specific gravity materials are necessary to produce an increase in the moment of inertia in comparison to low specific gravity materials. Furthermore, handling and processing conditions can also affect the type of heavy weight filler material incorporated into cover layers.

The most preferred ball construction uses a bronze filled mantle to increase the Moment of Inertia (M.O.I.). This construction utilizes a 19 parts per hundred (PPH) addition of bronze powder to the mantle. This results in a specific gravity of 1.12. It is possible to increase the amount of bronze or other heavy metal. Another most preferred filler is tungsten powder due to its very high specific gravity. Other heavy fillers may be utilized to reduce the amount of weighting material otherwise added to the core. The preferred minimum core specific gravity is about 1.05.

Using the multi-layer construction described herein, the mantle layer can be loaded with tungsten powder to produce a golf ball weighing about 45.5 grams. A preferred set of specific gravities for a preferred embodiment golf ball is set forth below.

TABLE 7

|  | Sp. Gr. |
| --- | --- |
| Core | 1.05 |
| Mantle | 1.63 |
| Cover | 0.96 |

A preferred mantle composition is as follows:

TABLE 8

|  | PPH | VOLUME % |
| --- | --- | --- |
| Ionomer | 100.0 | 104 |
| Tungsten | 75.7 | 3.9 |

Using tungsten powder, only 3.9% by volume is required to obtain a mantle specific gravity of 1.63. This greatly increases the M.O.I., reduces spin decay and increases the total distance of the resulting ball due to increased roll.

The calculated M.O.I. for this preferred construction is 0.4640. A typical 1.68 inch two-piece golf ball has a M.O.I. of 0.445 oz.-inch$^2$. Tungsten or other heavy metal can also be added to the outer cover to further increase the M.O.I. provided that the overall ball weight does not exceed the U.S.G.A. maximum. Adding the powdered metal to the cover will make it necessary to use a white pigmented paint to cover the dark color of the molded cover.

Core Assembly

The conventional solid core is about 1.545 inches in diameter, although it can range from about 1.495 to about 1.575 inches. Conventional solid cores are typically compression molded from a slug of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

The core compositions of the preferred embodiments of the present invention comprise one or more rubber or elastomeric components and an array of non-rubber or non-elastomeric components. The preferred rubber components of the core compositions of the invention comprise a particular solid polybutadiene having an ultra-high Mooney viscosity and certain molecular weight characteristics described in detail below, and one or more other optional polybutadienes. The non-rubber components of the core compositions of the invention comprise one or more crosslinking agents which preferably include an unsaturated carboxylic acid component, a free radical initiator to promote cross linking, one or more optional modifying agents, fillers such as those previously described with respect to the mantle, moldability additives, processing additives, and dispersing agents, all of which are described in greater detail below.

The preferred polybutadiene resin for use in the present invention composition has a relatively ultra high Mooney viscosity. A "Mooney" unit is an arbitrary unit used to measure the plasticity of raw, or unvulcanized rubber. The plasticity in Mooney units is equal to the torque, measured on an arbitrary scale, on a disk in a vessel that contains rubber at a temperature of 212° F. (100° C.) and that rotates at two revolutions per minute.

The measurement of Mooney viscosity, i.e. Mooney viscosity $[ML_{1+4}(100° C.)]$, is defined according to the standard ASTM D-1646, herein incorporated by reference. In ASTM D-1646, it is stated that the Mooney viscosity is not a true viscosity, but a measure of shearing torque over a range of shearing stresses. Measurement of Mooney viscosity is also described in the *Vanderbilt Rubber Handbook*, 13th Ed., (1990), pages 565–566, also herein incorporated by reference. Generally, polybutadiene rubbers have Mooney viscosities, measured at 212° F., of from about 25 to about 65. Instruments for measuring Mooney viscosities are commercially available such as a Monsanto Mooney Viscometer, Model MV 2000. Another commercially available device is a Mooney viscometer made by Shimadzu Seisakusho Ltd.

As will be understood by those skilled in the art, polymers may be characterized according to various definitions of molecular weight. The "number average molecular weight," $M_n$, is defined as:

$$M_n = \frac{\Sigma W_i}{\Sigma W_i / M_i}$$

where $W_i$ is the molecular weight of a fraction or sample of the polymer and $M_i$ is the total number of fractions or samples.

"Weight average molecular weight," $M_w$, is defined as:

$$M_w = \frac{\Sigma W_i M_i}{\Sigma W_i}$$

where $W_i$ and $M_i$ have the same meanings as noted above.

The "Z-average molecular weight," $M_z$, is defined as:

$$M_z = \frac{\Sigma W_i M_i^2}{\Sigma W_i M_i}$$

where $W_i$ and $M_i$ also have the same meanings as noted above.

"$M_{peak}$" is the molecular weight of the most common fraction or sample, i.e. having the greatest population.

Considering these various measures of molecular weight, provides an indication of the distribution or rather the "spread" of molecular weights of the polymer under review.

A common indicator of the degree of molecular weight distribution of a polymer is its "polydispersity," P:

$$P = \frac{M_w}{M_n}$$

Polydispersity, or "dispersity" as sometimes referred to herein, also provides an indication of the extent to which the polymer chains share the same degree of polymerization. If the polydispersity is 1.0, then all polymer chains must have the same degree of polymerization. Since weight average molecular weight is always equal to or greater than the number average molecular weight, polydispersity, by definition, is equal to or greater than 1.0:

$$P \geq 1.0$$

The particular polybutadiene for use in the preferred embodiment compositions of the present invention (i) exhibits a Mooney viscosity of from about 65 to about 85, and preferably from about 70 to about 83; ii) has a number average molecular weight $M_i$ of from about 90,000 to about 130,000; and preferably from about 100,000 to about 120,000; iii) has a weight average molecular weight $M_w$ of from about 250,000 to about 350,000; and preferably from about 290,000 to about 310,000; iv) has a Z-average molecular weight $M_z$ of about 600,000 to about 750,000; and preferably from about 660,000 to about 700,000; and, v) has a peak molecular weight $M_{peak}$ of about 150,000 to about 200,000; and preferably from about 170,000 to about 180,000.

The polydispersity of the particular polybutadiene for use in the preferred embodiment compositions typically ranges from about 1.9 to about 3.9; and preferably from about 2.4 to about 3.1. Most preferably, the polydispersity is about 2.7.

The particular polybutadiene for use in the preferred embodiment compositions preferably contains a majority fraction of polymer chains containing a cis-1, 4 bond, more preferably, having a cis-1,4 polybutadiene content of about 90%, and most preferably, having a cis-1,4 polybutadiene content of at least about 95%. A preferred polybutadiene, as described herein, is obtained by utilizing a cobalt or cobalt-based catalyst. However, polybutadienes exhibiting the foregoing characteristics, which are obtained by using a lanthanum rare earth catalyst, nickel catalyst, or mixtures thereof, are also encompassed by the present invention. It is also envisioned that other catalysts could be utilized to produce the particular preferred polybutadienes described herein. Examples of such other catalysts include, but are not limited to aluminum, boron, lithium, neodymium, titanium, and combinations thereof.

The polybutadiene utilized in the present invention is a solid at room temperature. Consequently, the polybutadiene is referenced as a "solid" polybutadiene, as opposed to a "liquid" which means that the rubber is flowable at room temperature.

A commercially available polybutadiene corresponding to the noted preferred ultra-high viscosity polybutadiene, and which is suitable for use in the preferred embodiment compositions in accordance with the present invention is available under the designation Cariflex BCP 820, from Shell Chimie of France. The properties and characteristics of this preferred polybutadiene are set forth below in Table 9.

TABLE 9

Properties of Shell Chimie BCP 820 (Also known as BR-1220X)

| Property | Value | |
|---|---|---|
| Mooney Viscosity (approximate) | 73–83 | |
| Volatiles Content | 0.5% maximum | |
| Ash Content | 0.1% maximum | |
| Cis 1,4-polybutadiene Content | 95.0% minimum | |
| Stabilizer Content | 0.2 to 0.3% | |
| Polydispersity | 2.7 | |
| Molecular Weight Data: | Trial 1 | Trial 2 |
| $M_n$ | 110,000 | 111,000 |
| $M_w$ | 300,000 | 304,000 |
| $M_z$ | 680,000 | |
| $M_{peak}$ | 175,000 | |

The compositions of the present invention may also utilize other polybutadiene resins in addition to the noted particular polybutadiene exhibiting an ultra-high Mooney viscosity, such as the BCP 820 resin. For example, Cariflex, BR-1220 polybutadiene available from Shell Chemical (see Table 10 below); and Taktene, 220 polybutadiene available from Bayer Corp. of Orange, Tex. (see Tables 11 and 12 below) may be utilized as other polybutadienes in combination with the particular ultra-high Mooney viscosity polybutadiene component described herein. Generally, these other polybutadienes have Mooney viscosities in the range of about 25 to 65. It is also contemplated that a similar polybutadiene resin, BCP 819, commercially available from Shell Chimie, may be used in conjunction with BCP 820.

TABLE 10

Properties of Cariflex BR-1220 Polybutadiene

Physical Properties:

Polybutadiene Rubber
CIS 1,4 Content - 97%–99% Min.
Stabilizer Type - Non Staining
Total Ash - 0.5% Max.
Specific Gravity - 0.90–0.92
Color - Transparent, clear, Lt. Amber
Moisture - 0.3% max. ASTM 1416.76 Hot Mill Method
Polymer Mooney Viscosity - (35–45 Cariflex) (ML 1 + 4 @ 212° F.)

TABLE 10-continued

Properties of Cariflex BR-1220 Polybutadiene

90% Cure - 10.0–13.0
Polydispersity 2.75–3.0

| Molecular Weight Data: | Trial 1 | Trial 2 |
|---|---|---|
| $M_n$ | 80,000 | 73,000 |
| $M_w$ | 220,000 | 220,000 |
| $M_z$ | 550,000 | |
| $M_{peak}$ | 110,000 | |

TABLE 11

Properties of Taktene 220 Polybutadiene

Physical Properties:

Polybutadiene Rubber
CIS 1,4 Content (%) - 98% Typical
Stabilizer Type - Non Staining 1.0–1.3%
Total Ash - 0.25 Max.
Raw Polymer Mooney Visc. - 35–45 40 Typical
(ML 1 + 4 @ 212 Deg. F./212° F.)
Specific Gravity - 0.91
Color - Transparent - almost colorless (15 APHA Max.)
Moisture % - 30% Max. ASTM 1416-76 Hot Mill Method

TABLE 12

Properties of Taktene 220 Polybutadiene

Product Description

A low Mooney viscosity, non-staining, solution polymerized, high cis-1,4-polybutadiene rubber.

| Property | Range | Test Method |
|---|---|---|
| Raw Polymer Properties | | |
| Mooney viscosity 1 + 4 (212° F.) | 40 ± 5 | ASTM D 1646 |
| Volatile matter (wt %) | 0.3 max. | ASTM D 1416 |
| Total Ash (wt %) | 0.25 max. | ASTM D 1416 |
| Cure Characteristics[1][2] | | |
| Minimum torque | | |
| $M_L$ (dN.m) | 9.7 ± 2.2 | ASTM D 2084 |
| (lbf.in) | 8.6 ± 1.9 | ASTM D 2084 |
| Maximum torque | | |
| $M_H$ (dN.m) | 35.7 ± 4.8 | ASTM D 2084 |
| (lbf.in) | 31.6 ± 4.2 | ASTM D 2084 |
| $t_2$1 (min) | 4 ± 1.1 | ASTM D 2084 |
| t'50 (min) | 9.6 ± 2.5 | ASTM D 2084 |
| t'90 (min) | 12.9 ± 3.1 | ASTM D 2084 |
| Other Product Features | Property | Typical Value |
| | Specific gravity | 0.91 |
| | Stabilizer type | Non-staining |

[1] Monsanto Rheometer at 160° C., 1.7 Hz (100 cpm), 1 degree arc, micro-die
[2] Cure characteristics determined on ASTM D 3189 MIM mixed compound:
TAKTENE 220    100 (parts by mass)
Zincoxide    3
Stearic acid    2
IRB #6 black (N330)    60
Naphthenic oil    15

TABLE 12-continued

Properties of Taktene 220 Polybutadiene

TBBS    0.9
Sulfur    1.5

*This specification refers to product manufactured by Bayer Corp., Orange, Texas, U.S.A.

The preferred embodiment core compositions of the present invention generally comprise from about 100 parts by weight of elastomeric or rubber components, i.e. the noted ultra-high Mooney viscosity polybutadiene, and from about 60 to about 80, or more, parts by weight of non-rubber or non-elastomeric components. Preferably, the core compositions comprise about 100 parts of rubber components and from about 60 to about 80, or more, parts by weight of non-rubber components. It will be understood that depending upon the types and respective function of components added to the non-rubber portion of the preferred embodiment core compositions, that the non-rubber portion may constitute a significantly greater proportion than the rubber portion. The rubber components include the previously described ultra-high Mooney viscosity polybutadiene. The non-rubber components are as follows.

Preferably, the crosslinking agent of the core composition is an unsaturated carboxylic acid component which is the reaction product of a carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the preferred core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 50, and preferably from about 20 to about 35 parts by weight of the carboxylic acid salt, such as zinc diacrylate (ZDA), is included per 100 parts of the rubber components in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bix (buylperoxy)valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercial available peroxides are Luperco 230 or 231 XL, a peroxyketal manufactured and sold by Atochem, Lucidol Division, Buffalo, N.Y., and Trigonox 17/40 or 29/40, a1, 1-di-(t-butylperoxy)-3,3,5-trimethyl cyclohexane sold by Akzo Chemie America, Chicago, Ill. The one hour half life of Luperco 231 XL is about 112° C., and the one hour half life of Trigonox 29/40 is about 129° C.

The core compositions of the present invention may additionally contain any other suitable and compatible modifying ingredients including, but not limited to, metal oxides, fatty acids, and diisocyanates. For example, Papi 94, a polymeric diisocyanate, commonly available from Dow Chemical Co., Midland, Mich. is an optional component in the rubber compositions. It can range from about 0 to 5 parts by weight per 100 parts by weight rubber (phr) component, and acts as a moisture scavenger.

Various activators may also be included in the compositions of the present invention. For example, zinc oxide and/or magnesium oxide are activators for the polybutadiene. The activator can range from about 2 to about 30 parts by weight per 100 parts by weight of the rubbers (phr) component.

The preferred fillers are relatively inexpensive and heavy and serve to lower the cost of the ball and to increase the weight of the ball to closely approach the U.S.G.A. weight limit of 1.620 ounces. Exemplary fillers include mineral fillers such as limestone, silica, mica barytes, calcium carbonate, or clays. Limestone is ground calcium/magnesium carbonate and is used because it is an inexpensive, heavy filler. Other heavy weight fillers include metal particles, such as powdered tungsten. A wide array of suitable fillers are noted herein with regard to the mantle.

As indicated, ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 20 to about 15 parts by weight based on 100 parts rubber (elastomer).

It is preferred that the core compositions include stearic acid as the fatty acid adjunct in an amount of from about 2 to about 5 parts by weight per 100 parts of rubber.

Diisocyanates may also be optionally included in the core compositions when utilized, the dioscyanates are included in amounts of from about 0.2 to about 5.0 parts by weight based on 100 parts rubber. Exemplary of suitable diisocyanates is 4,4"-diphenylmethane diisocyanate and other polyfunctional isocyanates known to the art.

Furthermore, the dialkyl tin difatty acids set forth in U.S. Pat. No. 4,844,471, the dispersing agents disclosed in U.S. Pat. No. 4,838,556, and the dithiocarbonates set forth in U.S. Pat. No. 4,852,884 may also be incorporated into the polybutadiene compositions of the present invention. The specific types and amounts of such additives are set forth in the above-identified patents, which are incorporated herein by reference.

As indicated above, additional suitable and compatible modifying agents such as fatty acids, and secondary additives such as Pecan shell flour, ground flash (i.e. grindings from previously manufactured cores of substantially identical construction), barium sulfate, zinc oxide, etc. may be added to the core compositions to increase the weight of the ball as necessary in order to have the ball reach or closely approach the U.S.G.A. weight limit of 1.620 ounces.

The second polybutadiene for use in the preferred embodiment golf ball core compositions is a polybutadiene that is obtained or synthesized by utilizing a neodymium or lanthanide series catalyst, and that exhibits a Mooney viscosity of from about 30 to about 70, preferably from about 35 to about 70, more preferably from about 40 to about 65, and most preferably from about 45 to about 60. While the second polybutadiene provides covers exhibiting higher C.O.R. values, it exhibits very poor cold flow properties and very high dry swell characteristics.

Examples of such second polybutadienes obtained by using a neodymium-based catalyst include NEOCIS 40, NEOCIS 60 from Enichem and CB-22, CB-23, and CB-24 from Bayer. The properties of these polybutadienes are given below.

TABLE 13

Properties of NEOCIS

| Properties of Raw Polymer | |
|---|---|
| Microstructure | |
| 1,4 cis (typical) | 97.5% |
| 1,4 trans (typical) | 1.7% |
| Vinyl (typical) | 0.8% |
| Volatile Matter (max) | 0.75% |
| Ash (max) | 0.30% |
| Stabilizer (typical) | 0.50% |
| Mooney Viscosity, ML 1 + 4 at 100° C. | 38–48 and 60–66 |
| Properties of compound (typical) | |
| Vulcanization at 145° C. | |
| Tensile strength, 35' cure, | 16 MPa |
| Elongation, 35' cure, | 440% |
| 300% modulus, 35' cure, | 9.5 MPa |

TABLE 14

Properties of CB-22

| TESTS | RESULTS | SPECIFICATIONS |
|---|---|---|
| 1. Mooney-Viscosity ML 1 + 4 100 Cel/ASTM-sheet | | |
| ML 1 + 1 Minimum | 58 | MIN. 58 ME |
| Maximum | 63 | MAX. 68 ME |
| Median | 60 | 58–68 ME |
| 2. Content of ash DIN 53568 | | |
| Ash | 0.1 | MAX. 0.5% |
| 3. Volatile matter heating 3 h/105 Cel | | |
| Loss in weight | 0.11 | MAX. 0.5% |
| 4. Organic acid Bayer Nr.18 | | |
| Acid | 0.33 | MAX. 1.0% |
| 5. CIS-1,4 content IR-spectroscopy | | |
| CIS 1,4 | 97.62 | MIN. 96.0% |
| 6. Vulcanization behavior Monsanto MDR/160 Cel | | |

TABLE 14-continued

Properties of CB-22

| TESTS | RESULTS | SPECIFICATIONS |
|---|---|---|
| DIN 53529 | | |
| Compound after | | |
| ts01 | 3.2 | 2.5–4.1 min |
| t50 | 8.3 | 6.4–9.6 min |
| t90 | 13.2 | 9.2–14.0 min |
| s'min | 4.2 | 3.4–4.4 dN.m |
| s'max | 21.5 | 17.5–21.5 dN.m |
| 7. Informative data | | |
| Vulcanization 150 Cel 30 min | | |
| Tensile | ca. 15.0 | |
| Elongation at break | ca. 450 | |
| Stress at 300% elongation | ca. 9.5 | |

TABLE 15

Properties of CB-23

| TESTS | RESULTS | SPECIFICATIONS |
|---|---|---|
| 1. Mooney-Viscosity | | |
| ML 1 + 4 100 Cel/ASTM-sheet | | |
| ML 1 + 4 Minimum | 50 | MIN. 46 ME |
| Maximum | 54 | MAX. 56 ME |
| Median | 51 | 46–56 ME |
| 2. Content of ash | | |
| DIN 53568 | 0.09 | MAX. 0.5% |
| Ash | | |
| 3. Volatile matter | | |
| DIN 53526 | | |
| Loss in weight | 0.19 | MAX. 0.5% |
| 4. Organic acid | | |
| Bayer Nr.18 | | |
| Acid | 0.33 | MAX. 1.0% |
| 5. CIS-1,4 content | | |
| IR-spectroscopy | | |
| CIS 1,4 | 97.09 | MIN. 96.0% |
| 6. Vulcanization behaviour | | |
| Monsanto MDR/160 Cel | | |
| DIN 53529 | | |
| Compound after | MIN. 96.0 | |
| ts01 | 3.4 | 2.4–4.0 min |
| t50 | 8.7 | 5.8–9.0 min |
| t90 | 13.5 | 8.7–13.5 min |
| s'min | 3.1 | 2.7–3.8 dN.m |
| s'max | 20.9 | 17.7–21.7 dN.m |
| 7. Vulcanization test | | |
| with ring | | |
| Informative data | | |
| Tensile | ca.15.5 | |
| Elongation at break | ca. 470 | |
| Stress at 300% elongation | ca.9.3 | |

TABLE 16

Properties of CB-24

| TESTS | RESULTS | SPECIFICATIONS |
|---|---|---|
| 1. Mooney-Viscosity | | |
| ML 1 + 4 100 Cel/ASTM-sheet | | |
| ML 1 + 4 Minimum | 44 | MIN. 39 ME |
| Maximum | 46 | MAX. 49 ME |
| Median | 45 | 39–49 ME |
| 2. Content of ash | | |
| DIN 53568 | | |
| Ash | 0.12 | MAX. 0.5% |
| 3. Volatile matter | | |
| DIN 53526 | | |
| Loss in weight | 0.1 | MAX. 0.5% |
| 4. Organic acid | | |
| Bayer Nr.18 | | |
| Acid | 0.29 | MAX. 1.0% |
| 5. CIS-1,4 content | | |
| IR-spectroscopy | | |
| CIS 1,4 | 96.73 | MIN. 96.0% |
| 6. Vulcanization behaviour | | |
| Monsanto MDR/160 Cel | | |
| DIN 53529 | | |
| Compound after | | |
| masticator | | |
| ts01 | 3.4 | 2.6–4.2 min |
| t50 | 8.0 | 6.2–9.4 min |
| t90 | 12.5 | 9.6–14.4 min |
| s'min | 2.8 | 2.0–3.0 dN.m |
| s'max | 19.2 | 16.3–20.3 dN.m |
| 7. Informative data | | |
| Vulcanization 150 Cel 30 min | | |
| Tesile | ca. 15.0 | |
| Elongation at break | ca. 470 | |
| Stress at 300% elongation | ca. 9.1 | |

It has been found that when the first and second polybutadienes are blended together within certain ranges, golf ball cores can be produced without the individual processing difficulties associated with each polybutadiene. In essence, a synergistic effect is produced allowing the blends to produce golf ball cores using conventional equipment exhibiting enhanced resilience.

These preferred embodiment golf ball cores can be formed by the techniques described in U.S. application Ser. No. 09/248,016, filed Feb. 10, 1999, herein incorporated by reference.

The golf balls of the present invention can be produced by molding processes currently well known in the golf ball art. Specifically, the golf balls can be produced by injection molding or compression molding the inner cover layer about wound or solid molded cores to produce an intermediate golf ball having a diameter of about 1.50 to 1.67 inches, and preferably about 1.620 inches. The outer layer is subsequently molded over the inner layer to produce a golf ball having a diameter of 1.680 inches or more. Although either solid cores or wound cores can be used in the present invention, as a result of their lower cost and superior performance, solid molded cores are preferred over wound cores.

In compression molding, the inner cover composition is formed via injection at about 380° F. to about 450° F. into smooth surfaced hemispherical shells which are then positioned around the core in a mold having the desired inner cover thickness and subjected to compression molding at 2000 to 300° F. for about 2 to 10 minutes, followed by cooling at 500 to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° F. to about 100° F. Subsequently, the outer cover layer is molded about the core and the inner layer by similar compression or injection molding techniques to form a dimpled golf ball of a diameter of 1.680 inches or more.

After molding, the golf balls produced may undergo various further processing steps such as buffing, painting and marking as disclosed in U.S. Pat. No. 4,911,451.

The resulting golf ball produced from the low acid ionomer resin inner layer and the relatively softer, low flexural modulus outer layer provide for an improved multi-layer golf ball which provides for desirable coefficient of restitution, compression, spin and durability properties while at the same time offering the feel characteristics associated with soft balata and balata-like covers of the prior art.

Another aspect to the present invention golf ball is that the ball is formed to exhibit a desired natural frequency such as described in U.S. application Ser. Nos. 09/371,994 and 09/371,628, both filed Aug. 11, 1999, and both herein incorporated by reference. In this aspect of the invention the golf ball utilizes a relatively soft core having a natural frequency of 3100 Hz or less. In order to achieve this, the ball exhibits a soft compression similar to the Spalding Aero™ golf ball. This golf ball may include a non-circular dimple design such as the Aero dimple design or an improved optimized dimple pattern.

It is also contemplated that the present invention golf balls may utilize a liquid, hollow, or wound core a such are known in the art.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLE 1

Several intermediate balls (cores plus inner cover layers) were prepared in accordance with conventional molding procedures described above. The inner cover compositions were molded around 1.545 inch diameter cores weighing 36.5 grams such that the inner cover had a wall thickness of about 0.0675 inches, with the overall ball measuring about 1.680 inches in diameter.

The cores utilized in many of the noted examples were comprised of the following ingredients: high cis-polybutadiene, zinc diacrylate, zinc oxide, zinc stearate, peroxide, calcium carbonate, etc. The molded cores exhibited Riehle compressions of about 60 and C.O.R. values of about 0.800. A representative formulation of the molded cores is set forth below:

TABLE 17

| MATERIAL | WEIGHT |
| --- | --- |
| BR-1220 (high cis-polybutadiene) | 70.70 |
| Taktene 220 (high cis-polybutadiene) | 29.30 |
| React Rite ZDA (zinc diacrylate) | 31.14 |
| Zinc Oxide | 6.23 |
| Zinc Stearate | 20.15 |
| Limestone | 17.58 |
| Ground Flash (20–40 Mesh) | 20.15 |

TABLE 17-continued

| MATERIAL | WEIGHT |
| --- | --- |
| Blue Master batch | .012 |
| Luperco 231XL or Trigonox 29/40 | .89 |
| Papi 94 | .50 |

[1]Blue Master batch consists of unknown compositions used only for internal identification purposes and has no effect on physical properties.

The inner cover compositions designated herein as compositions A-E utilized to formulate the intermediate balls are set forth in Table 18 below. The resulting molded intermediate balls were tested to determine the individual compression (Riehle), C.O.R., Shore C hardness, spin rate and cut resistance properties. These results are also set forth in Table 18 below.

The data of these examples are the average of twelve intermediate balls produced for each example. The properties were measured according to the following parameters:

Coefficient of restitution (C.O.R.) was measured by firing the resulting golf ball in an air canon at a velocity of 125 feet per second against a steel plate positioned 12 feet from the muzzle of the canon. The rebound velocity was then measured. The rebound velocity was divided by the forward velocity to give a coefficient of restitution.

Shore hardness was measured in accordance with ASTM test 2240.

Cut resistance was measured in accordance with the following procedure: A golf ball is fired at 135 feet per second against the leading edge of a pitching wedge wherein the leading edge radius is $\frac{1}{32}$ inch, the loft angle is 51 degrees, the sole radius is 2.5 inches and the bounce angle is 7 degrees.

The cut resistance of the balls tested herein was evaluated on a scale of 1 to 5. The number 1 represents a cut that extends completely through the cover to the core. A 2 represents a cut that does not extend completely through the cover but that does break the surface. A 3 does not break the surface of the cover but does leave a permanent dent. A 4 leaves only a slight crease which is permanent but not as severe as 3. A 5 represents virtually no visible indentation or damage of any sort.

The spin rate of the golf ball was measured by striking the resulting golf balls with a pitching wedge or 9 iron wherein the club head speed is about 105 feet per second and the ball is launched at an angle of 26 to 34 degrees with an initial velocity of about 110 to 115 feet per second. The spin rate was measured by observing the rotation of the ball in flight using stop action Strobe photography.

Initial velocity is the velocity of a ball when struck at a hammer speed of 143.8 feet per second in accordance with a test as prescribed by the U.S.G.A.

As will be noted, compositions A, B and C include high acid ionomeric resins (16% or more acid), with composition B further including zinc stearate. Composition D represents the inner layer (i.e. Surlyn 1605) used in U.S. Pat. No. 4,431,193. Composition E provides a hard, low acid ionomeric resin blend.

The purpose behind producing and testing the balls of Table 18 was to provide a subsequent comparison in properties with the multi-layer golf balls of the present invention.

TABLE 18

Molded Intermediate Golf Balls

|  | A | B | C | D | E |
|---|---|---|---|---|---|
| Ingredients of Inner Cover Compositions | | | | | |
| Iotek 959 | 50 | 50 | — | — | — |
| Iotek 960 | 50 | 50 | — | — | — |
| Zinc Stearate | — | 50 | — | — | — |
| Surlyn 8162 | — | — | 75 | — | — |
| Surlyn 8422 | — | — | 25 | — | — |
| Surlyn 1605 | — | — | — | 100 | — |
| Iotek 7030 | — | — | — | — | 50 |
| Iotek 8000 | — | — | — | — | 50 |
| Properties of Molded Intermediate Balls | | | | | |
| Compression | 58 | 58 | 60 | 63 | 62 |
| C. O. R. | .811 | .810 | .807 | .793 | .801 |
| Shore C Hardness | 98 | 98 | 97 | 96 | 96 |
| Spin Rate (R. P. M.) | 7,367 | 6,250 | 7,903 | 8,337 | 7,956 |
| Cut Resistance | 4–5 | 4–5 | 4–5 | 4–5 | 4–5 |

As shown in Table 18 above, the high acid ionomer resin inner cover layer (molded intermediate balls A–C) have lower spin rates and exhibit higher resiliency characteristics than the low acid ionomer resin based inner cover layers of balls D and E.

Multi-layer balls in accordance with the present invention were then prepared. Specifically, the inner cover compositions used to produce intermediate golf balls from Table 18 were molded over the solid cores to a thickness of about 0.0375 inches, thus forming the inner layer. The diameter of the solid core with the inner layer measured about 1.620 inches. Alternatively, the intermediate golf balls of Table 18 were ground down using a centerless grinding machine to a size of 1.620 inches in diameter to produce an inner cover layer of 0.0375 inches.

The size of 1.620 inches was determined after attempting to mold the outer cover layer to various sizes (1.600", 1.610", 1.620", 1.630" and 1.640") of intermediate (core plus inner layer) balls. It was determined that 1.620" was about the largest "intermediate" ball (i.e., core plus inner layer) which could be easily molded over with the soft outer layer materials of choice. The goal herein was to use as thin an outer layer as necessary to achieve the desired playability characteristics while minimizing the cost of the more expensive outer materials. However, with a larger diameter final golf ball and/or if the cover is compression molded, a thinner cover becomes feasible.

With the above in mind, an outer cover layer composition was blended together in accordance with conventional blending techniques. The outer layer composition used for this portion of the example is a relatively soft cover composition such as those listed in U.S. Pat. No. 5,120,791. An example of such a soft cover composition is a 45% soft/55% hard low acid ionomer blend designated by one of the inventors as "TE-90". The composition of TE-90 is set forth in Table 19 as follows:

TABLE 19

| Outer Cover Layer Composition TE-90 | |
|---|---|
| Iotek 8000 | 22.7 weight % |
| Iotek 7030 | 22.7 weight % |
| Iotek 7520 | 45.0 weight % |
| White MB[1] | 9.6 weight % |

[1]White MB consists of about 23.77 weight percent TiO$_2$; 0.22 weight percent Uvitex OB, 0.03 weight percent Santonox R, 0.05 weight percent Ultramarine blue and 75.85 weight percent Iotek 7030.

The above outer layer composition was molded around each of the 1.620 diameter intermediate balls comprising a core plus one of compositions A–D, respectively. In addition, for comparison purposes, Surly® 1855 (new Surlyn® 9020), the cover composition of the '193 patent, was molded about the inner layer of composition D (the intermediate ball representative of the '193 patent). The outer layer TE-90 was molded to a thickness of approximately 0.030 inches to produce a golf ball of approximately 1.680 inches in diameter. The resulting balls (a dozen balls for each example) were tested and the various properties thereof are set forth in Table 20 as follows:

TABLE 20

| | Finished Balls | | | | |
|---|---|---|---|---|---|
| | 1 | 2 | 3 | 4 | 5 |
| Ingredients: | | | | | |
| Inner Cover Composition | A | B | C | D | D |
| Outer Cover Composition | TE-90 | TE-90 | TE-90 | TE-90 | Surlyn® 9020 |
| Properties of Molded Finished Balls: | | | | | |
| Compression | 63 | 63 | 69 | 70 | 61 |
| C. O. R. | .784 | .778 | .780 | .770 | .757 |
| Shore C Hardness | 88 | 88 | 88 | 88 | 89 |
| Spin (R. P. M.) | 8,825 | 8,854 | 8,814 | 8,990 | 8,846 |
| Cut Resistance | 3–4 | 3–4 | 3–4 | 3–4 | 1–2 |

As it will be noted in finished balls 1–4, by creating a multi-layer cover utilizing the high acid ionomer resins in the inner cover layer and the hard/soft low acid ionomer resins in the outer cover layer, higher compression and increased spin rates are noted over the single layer covers of Table 18. In addition, both the C.O.R. and the Shore C hardness are reduced over the respective single layer covers of Table 18. This was once again particularly true with respect to the multi-layered balls containing the high acid ionomer resin in the inner layer (i.e. finished balls 1–4). In addition, with the exception of prior art ball 5 (i.e. the '193 patent), resistance to cutting remains good but is slightly decreased. As noted above, the prior art ball of the '193 patent suffers substantially in durability (as well as in resiliency) in comparison to the balls of the invention.

Furthermore, it is also noted that the use of the high acid ionomer resins as the inner cover material produces a substantial increase in the finished ball's overall distance properties. In this regard, the high acid ionomer resin inner covers of balls 1–3 produce an increase of approximately 10 points in C.O.R. over the low acid ionomer resin inner covers of balls 4 and about a 25 point increase over the prior art balls 5. Since an increase in 3 to 6 points in C.O.R. results in an average increase of about 1 yard in distance, such an improvement is deemed to be significant.

Several other outer layer formulations were prepared and tested by molding them around the core and inner cover layer combination to form balls each having a diameter of about 1.68 inches. First, B.F.Goodrich Estane® X-4517 polyester polyurethane was molded about the core molded with inner layer cover formulation A. DuPont Surlyn® 9020 was molded about the core which was already molded with inner layer D. Similar properties tests were conducted on these golf balls and the results are set forth in Table 21 below:

TABLE 21

Finished Balls

|  | 6 | 7 |
|---|---|---|
| Ingredients: |  |  |
| Inner Cover Layer Composition | A | D |
| Outer Cover Layer Composition | Estane ® 4517 | Surlyn ® 9020 |
| Properties of Molded Finished Balls: |  |  |
| Compression | 67 | 61 |
| C. O. R. | .774 | .757 |
| Shore C Hardness | 74 | 89 |
| Spin (R. P. M.) | 10,061 | 8,846 |
| Cut Resistance | 3–4 | 1–2 |

The ball comprising inner layer formulation D and Surlyn® 9020 identifies the ball in the Nesbitt U.S. Pat. No. 4,431,193. As is noted, the example provides for relatively high softness and spin rate though it suffers from poor cut resistance and low C.O.R. This ball is unacceptable by today's standards.

As for the Estane® X-4517 polyester polyurethane, a significant increase in spin rate over the TE-90 cover is noted along with an increased compression. However, the C.O.R. and Shore C values are reduced, while the cut resistance remains the same. Furthermore, both the Estane® X-4517 polyester polyurethane and the Surlyn® 9020 were relatively difficult to mold in such thin sections.

EXAMPLE 2

In order to analyze the change in characteristics produced by multi-layer golf balls (standard size) having inner cover layers comprised of ionomer resin blends of different acid levels, a series of experiments were run. Specifically, numerous tests were performed, varying the type of core, inner cover layer and outer cover layer. The results are shown below in Table 22.

In this regard, "Top Grade" or "TG" is a low acid inner cover ionomer resin blend comprising 70.6% Iotek 8000, 19.9% Iotek 7010 and 9.6% white master batch. "959/960" is a 50/50 wt/wt blend of Iotek 959/960. In this regard, Escor® or Iotek 959 is a sodium ion neutralized ethylene-acrylic neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are set forth in Table 23 as follows:

TABLE 23

| PROPERTY | ESCOR ® (IOTEK) 959 | ESCOR ® (IOTEK) 960 |
|---|---|---|
| Melt Index g/10 min | 2.0 | 1.8 |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

Furthermore, the low acid ionomer formulation for "SD 90" and "Z-Balata" are set forth below in Table 24:

TABLE 24

| SD Cover | ZB Cover |
|---|---|
| 17.2% Surlyn 8320 | 19% Iotek 8000 |
| 7.5% Surlyn 8120 | 19% Iotek 7030 |
| 49% Surlyn 9910 | 52.5% Iotek 7520 |
| 16.4% Surlyn 8940 | 9.5% white MB |
| 9.7% white MB |  |

The data clearly indicates that higher C.O.R. and hence increased travel distance can be obtained by using multi-layered covered balls versus balls covered with single layers. However, some sacrifices in compression and spin are also noted. Further, use of lower acid level inner cover layers and relatively soft outer cover layers (i.e., 50 wt. % or more soft ionomer) produces softer compression and higher spin rates than the golf balls comprised of high acid inner cover layers. Consequently, use of blends of low acid ionomer resins to produce the inner layer of a multi-layer covered golf ball, produces not only enhanced travel distance but also enhanced compression and spin properties.

TABLE 22

| Sample # | CORE | INNER LAYER | THICKNESS | COMP/COR | OUTER COVER | THICKNESS | COMP (Rhiele) | COR | SHORE D | SPIN |
|---|---|---|---|---|---|---|---|---|---|---|
| 1 | 1042 YELLOW | NONE | — | SEE BELOW | TOP GRADE | 0.055" | 61 | .800 | 68 | 7331 |
| 2 | 1042 YELLOW | NONE | — | SEE BELOW | 959/960 | 0.055" | 56 | .808 | 73 | 6516 |
| 3 | SPECIAL 1.47" | 959/960 | 0.050" | 65/.605 | 959/960 | 0.055" | 48 | .830 | 73 | 6258 |
| 4 | 1042 YELLOW | NONE | — | SEE BELOW | SD 90 | 0.055" | 62 | .792 | 63 | 8421 |
| 5 | SPECIAL 1.47" | TOP GRADE | 0.050" | 66/.799 | SD 90 | 0.055" | 55 | .811 | 63 | 8265 |
| 6 | SPECIAL 1.47" | 959/960 | 0.050" | 65/.605 | SD 90 | 0.055" | 53 | .813 | 63 | 8254 |
| 7 | SPECIAL 1.47" | TOP GRADE | 0.050" | 66/.799 | TOP GRADE | 0.055" | 51 | .819 | 68 | 7390 |
| 8 | 1042 YELLOW | NONE | — | SEE BELOW | Z-BALATA | 0.055" | 67 | .782 | 55 | 9479 |
| 9 | SPECIAL 1.47" | 959/960 | 0.050" | 65/.805 | Z-BALATA | 0.055" | 61 | .800 | 55 | 9026 |
| 10 | SPECIAL 1.47" | TOP GRADE | 0.050" | 66/.799 | Z-BALATA | 0.055" | 60 | .798 | 55 | 9262 |

1042 YELLOW > COMP = 72, COR = .780
SPECIAL 1.47" CORE > COMP = 67, COR = .782

EXAMPLE 3

Multi-layer oversized golf balls were produced utilizing different ionomer resin blends as the inner cover layer (i.e., core plus inner cover layer is defined as "mantel"). The "ball data" of the oversized multi-layer golf balls in comparison with production samples of "Top-Flite® XL" and "Top-Flite® Z-Balata" is set forth below in Table 25.

TABLE 25

|  | 1 | 2 | 3 | 4 Top-Flite ® XL | 5 Top-Flite ® Z-Balata 90 |
|---|---|---|---|---|---|
| Core Data |  |  |  |  |  |
| Size | 1.43 | 1.43 | 1.43 | 1.545 | 1.545 |
| COR | .787 | .787 | .787 | — | — |
| Mantle Data |  |  |  |  |  |
| Material | TG | TG | TG | — | — |
| Size | .161 | 1.61 | 1.61 | — | — |
| Thickness | .090 | .090 | .090 | — | — |
| Shore D | 68 | 68 | 68 | — | — |
| Compression | 57 | 57 | 57 | — | — |
| COR | .815 | .815 | .815 | — | — |
| Ball Data |  |  |  |  |  |
| Cover | TG | ZB | SD | TG | ZB |
| Size | 1.725 | 1.723 | 1.726 | 1.681 | 1.683 |
| Weight | 45.2 | 45.1 | 45.2 | 45.3 | 45.5 |
| Shore D | 68 | 56 | 63 | 68 | 56 |
| Compression | 45 | 55 | 49 | 53 | 77 |
| COR | .820 | .800 | .810 | .809 | .797 |
| Spin | 7230 | 9268 | 8397 | 7133 | 9287 |

The results indicate that use of multi-layer covers enhances C.O.R. and travel distance. Further, the data shows that use of a blend of low acid ionomer resins (i.e., "Top Grade") to form the inner cover layer in combination with a soft outer cover ("ZB" or "SD") produces enhanced spin and compression characteristics. The overall combination results in a relatively optimal golf ball with respect to characteristics of travel distances, spin and durability.

EXAMPLE 4

Another series of trials were performed in which preferred embodiment golf balls comprising a core, a mantle, and cover assembly were formed as follows in Tables 26–28.

TABLE 26

| CORE | | | |
|---|---|---|---|
| Formulation | | | |
| Ingredients | pph | Data | |
| Cariflex 1220 | 70 | Diameter | 1.47" |
| Taktene 220 | 30 | Weight | 31.5 g |
| Zinc Oxide | 25 | S.G. | 1.16 |
| TG regrind | 0 | Compression | 125 |
| Zinc Stearate | 20 | COR | 775 |
| ZDA | 19.5 | Shore C/D | 77/42 |
| Color MB | 0.2 | | |
| 231 XL | 0.9 | | |

TABLE 27

| MANTLE | | | |
|---|---|---|---|
| Formulation | | | |
| Ingredients | % Acid + Type | % N + Cation | PPH |
| Iotek 1002 | 18% AA | 31% Na | 35 |
| Surlyn 6120 | 19% MA | Unknown % Mg | 65 |
| Bronze Powder | — | — | 19.0 |
| Titanium Dioxide | — | — | 0.1 |
| Data | | | |
| Flex Modulus (weighted avg) | | 470 Mpa | |
| Diameter | | 1.57" | |
| Weight | | 38.3 g | |
| S. G. mantle | | 1.12+/−0.05 | |
| Compression (Riehle/PGA) | | 93/67 | |
| COR | | 802 | |
| Shore C/D | | 97/71 | |
| Stiffness Modulus | | 3521 Kgf/cm$^2$ | |

TABLE 28

| FINAL BALL | | | |
|---|---|---|---|
| Formulation | | | |
| Ingredients | % Acid + Type | % N + Cation | PPH |
| Surlyn 8940 | 15% MA | 30% Na | 17 |
| Surlyn 9910 | 15% MA | 59% Zn | 50.1 |
| Surlyn 8120 | ~7 MA | Unknown % Na | 7.7 |
| Surlyn 6320 | 15% AA | 25% Zn | 17.9 |
| Iotek 7030 | | | 73 |
| Whitener Package* | | | 2.37 |
| Data | | | |
| Flex Modulus (weighted avg) | | 240 Mpa | |
| Diameter | | 1.68" | |
| Cover Thickness | | 0.055" | |
| Weight | | 45.5 g | |
| S. G. cover | | 0.98 | |
| Compression (Riehle/PGA) | | 79/81 | |
| COR | | 801 | |
| Shore C/D | | 93/62 | |
| Moment of Inertia | | 0.4456 | |

*Whitener package contains a blend of titanium dioxide, Eastobrite OB-1 optical brightener, Ultra Marine blue pigment and Santonox R antioxidant Yet another series of trials were conducted in which various core assemblies were prepared and summarized in Table 29 as follows:

TABLE 29

| INCREASED C. O. R. - ULTIMATE CORE | | | | | |
|---|---|---|---|---|---|
|  | 1 CONTROL | 2 | 3 | 4 | 5 |
| Cariflex BR-1220 | 70 | 70 | — | — | — |
| Taktene 220 | 30 | 30 | — | — | — |
| BCP-820 (1220X) | — | — | 100 | 100 | 100 |
| Zinc Oxide | 31.5 | 31 | 31.2 | 31 | 5 |
| Tungsten Powder | — | — | — | — | 21 |
| Zinc Stearate | 16 | 16 | 16 | 16 | 16 |
| Regrind | 16 | 0 | 0 | 0 | 0 |
| Zinc Diacrylate | 20 | 21 | 20.5 | 20.9 | 23 |
| 231 XL | 0.9 | 0.9 | 0.9 | — | — |
| Trig 42-40B | — | — | — | 1.25 | 1.25 |
|  | 184.4 | 168.9 | 168.6 | 169.15 | 166.25 |

TABLE 29-continued

INCREASED C. O. R. - ULTIMATE CORE

|  | 1 CONTROL | 2 | 3 | 4 | 5 |
|---|---|---|---|---|---|
| Size Pole (inches) | 1.494 | 1.490 | 1.494 | 1.494 | 1.494 |
| Weight (grams) | 34.3 | 34.2 | 34.3 | 34.3 | 34.3 |
| Compression (Riehle) | 106 | 110 | 103 | 103 | 104 |
| C. O. R. | .769 | .770 | .781 | .785 | .792 |
| 'NES' Factor* | 875 | 880 | 884 | 888 | 896 |
| Increase C. O. R. vs. Control |  | +5 | +9 | +13 | +21 |

*The sum of the Riehle Compression and the C. O. R. give a number. The higher the number the higher the resilience i.e. Formula #2 is one point faster than the Control C. O. R., but is 4 points softer. If Formula #2 was the same compression as #1 (by increasing the ZDA content) then it would be 5 points faster Table 29 shows how the C.O.R. can be improved up to 21 points. The control formulation uses conventional ingredients. Removing the "regrind" or ground flash as in formulation #2, increases the C.O.R. by 5 points. Formulation #3 uses the high molecular weight rubber BCP-820 described herein. Data concerning high molecular weight/neodymium rubber for improved processing, demonstrate improved C.O.R. In formulation #3 the C.O.R. increase is 4 points. Formulation #4 shows an additional 4 point increase. Trigonox 42–40B is chemically tertbutyl peroxy-3,5,5 trimethyl hexanoate supplied by Akzo Nobel—Chicago, Ill. Formulation #5 uses powdered tungsten as the weighting material. Zinc oxide is lowered to 5 parts by weight and 21 parts of tungsten are used resulting in an 8 point increase in C.O.R. for a total of 21 points.

Yet another series of trials were performed in which cores of various compositions were formed as follows and listed in Table 30:

TABLE 30

High Branched 70 Mooney CB-22 vs. Neo Cis 60 and Taktene 1220

|  | 6 | 7 | 8 | 9 |
|---|---|---|---|---|
| CB-22 (70 Mooney) | — | — | — | 100 |
| Taktene 1220 (reg) | 100 | — | — | — |
| Neo Cis 60 | — | 100 | — | — |
| CB-1414 | — | — | 100 | — |
| Zinc Oxide | 23 |  |  |  |
| Zinc Stearate | 16 |  |  |  |
| Zinc Diacrylate | 22 |  |  |  |
| Color M. B. | Red | Yellow | Green | Blue |
| Trig 42-40B | 1.25 |  |  |  |
|  | 162.25 |  |  |  |
| Size pole (inches) | 1.564 | 1.563 | 1.564 | 1.566 |
| Weight (grams) | 38.2 | 38.18 | 38.18 | 38.3 |
| Compression (Riehle) | .111 | .110 | .107 | .114 |
| C. O. R. | .781 | .787 | .789 | .787 |
| 'Nes' Factor | 892 | 897 +5 | 896 +4 | 901 +9 |

In another series of trials, various mantle layers were formed, utilizing various filler materials. These are set forth below in Table 31.

TABLE 31

| Sample No. | Additive to Mantle | SIZE Center & Mantle | SIZE Molded Cover | WEIGHT Center & Mantle | WEIGHT Molded Cover | COMP. (RIEHLE) Center & Mantle | COMP. (RIEHLE) Molded Cover | C.O.R. Center & Mantle | C.O.R. Molded Cover |
|---|---|---|---|---|---|---|---|---|---|
| 10 | Bismuth Powder | 1.573 | 1.686 | 38.8 | 45.89 | 84 | 79 | 0.7921 | 0.7765 |
| 11 | Boron Powder | 1.574 | 1.686 | 38.8 | 45.79 | 83 | 79 | 0.7943 | 0.7754 |
| 12 | Brass Powder | 1.575 | 1.686 | 38.9 | 45.9 | 84 | 80 | 0.7944 | 0.7757 |
| 13 | Bronze Powder | 1.573 | 1.686 | 38.8 | 45.89 | 84 | 80 | 0.7936 | 0.7770 |
| 14 | Cobalt Powder | 1.573 | 1.686 | 38.9 | 45.88 | 82 | 79 | 0.7948 | 0.7775 |
| 15 | Copper Powder | 1.574 | 1.686 | 38.9 | 45.9 | 84 | 80 | 0.7932 | 0.7762 |
| 16 | Inconel Metal Powder | 1.574 | 1.687 | 39.0 | 45.94 | 83 | 80 | 0.7926 | 0.7757 |
| 17 | Iron Powder | 1.575 | 1.686 | 38.9 | 45.98 | 83 | 79 | 0.7928 | 0.7759 |
| 18 | Molybdenum Powder | 1.575 | 1.686 | 38.9 | 45.96 | 84 | 80 | 0.7919 | 0.7765 |
| 19 | Nickel Powder | 1.574 | 1.686 | 38.9 | 45.96 | 85 | 79 | 0.37917 | 0.7753 |
| 20 | Stainless Steel Powder | 1.574 | 1.687 | 38.9 | 45.92 | 86 | 78 | 0.7924 | 0.7757 |
| 21 | Titanium Metal Powder | 1.574 | 1.687 | 39.0 | 45.92 | 84 | 79 | 0.7906 | 0.7746 |
| 22 | Zirconium Oxide Powder | 1.575 | 1.686 | 38.9 | 45.92 | 85 | 80 | 0.7920 | 0.7761 |
| 23 | Control | 1.574 | 1.686 | 38.5 | 45.63 | 86 | 80 | 0.7925 | 0.7771 |
| 24 | Aluminum Flakes | 1.575 | 1.687 | 39.0 | 45.91 | 84 | 77 | 0.7830 | 0.7685 |
| 25 | Alumunium Tadpoles | 1.576 | 1.687 | 39.0 | 45.96 | 83 | 78 | 0.7876 | 0.7717 |
| 26 | Aluminum Flakes | 1.576 | 1.686 | 38.9 | 45.92 | 80 | 77 | 0.7829 | 0.7676 |
| 27 | Carbon Fibers | 1.576 | 1.687 | 38.9 | 45.88 | 79 | 74 | 0.7784 | 0.7633 |
| 28 | Control | 1.576 | 1.687 | 38.7 | 45.74 | 82 | 79 | 0.7880 | 0.7737 |

Golf balls according to the present invention were prepared with various metal fillers as summarized in Table 32. Batches mixed in Banbury in 1300 g batches. Then sheeted off on mill and granulated. Control was also ended in Banbury, sheeted on mill and granulated.

TABLE 32

Multi Layer Ball With Powdered Metal etc. in the Mantle Layer

| Sample No. | EX 1002 | EX 1003 | ADDITIVE | COLOR OF ADDITIVE |
|---|---|---|---|---|
| 10 | 47.5% | 47.5% | 5% BISMUTH POWDER | GREY |
| 11 | 47.5% | 47.5% | 5% BORON POWDER | BROWN |
| 12 | 47.5% | 47.5% | 5% BRASS POWDER | TAN |
| 13 | 47.5% | 47.5% | 5% BRONZE POWDER | TAN |

TABLE 32-continued

Multi Layer Ball With Powdered Metal etc. in the Mantle Layer

| Sample No. | EX 1002 | EX 1003 | ADDITIVE | COLOR OF ADDITIVE |
|---|---|---|---|---|
| 14 | 47.5% | 47.5% | 5% COBALT POWDER | GREY |
| 15 | 47.5% | 47.5% | 5% COPPER POWDER | LIGHT BROWN |
| 16 | 47.5% | 47.5% | 5% INCONNEL METAL POWDER | GREY |
| 17 | 47.5% | 47.5% | 5% IRON METAL POWDER | GREY |
| 18 | 47.5% | 47.5% | 5% MOLYBDENUM POWDER | GREY |
| 19 | 47.5% | 47.5% | 5% NICKEL POWDER | GREY |
| 20 | 47.5% | 47.5% | 5% STAINLESS STEEL POWDER | GREY |
| 21 | 47.5% | 47.5% | 5% TITANIUM METAL POWDER | GREY |
| 22 | 47.5% | 47.5% | 5% ZIRCONIUM OXIDE POWDER | WHITE |
| 23 | 50% | 50% | — | |
| 24 | 47.0% | 47.5% | 5% ALUMINUM FLAKES | SILVER |
| 25 | 47.5% | 47.5% | 5% ALUMINUM TADPOLES | SILVER |
| 26 | 47.5% | 47.5% | 5% GLITTEREX A1 FLAKES 4 × 15 | SILVER |
| 27 | 47.5% | 47.5% | 5% CARBON FIBERS GRAPHITE | BLACK |
| 28 | 50% | 50% | | |

These balls had the following properties shown in Tables 33 and 34:

TABLE 33

| | Sample No. | SIZE Center & Mantle | SIZE Molded Cover | WEIGHT Center & Mantle | WEIGHT Molded Cover | COMP. (RIEHLE) Center & Mantle | COMP. (RIEHLE) Molded Cover | C.O.R. Center & Mantle | C.O.R. Molded Cover |
|---|---|---|---|---|---|---|---|---|---|
| | 10 | 1.573 | 1.686 | 38.8 | 45.89 | 84 | 79 | 0.7921* | 0.7765 |
| | 11 | 1.574 | 1.686 | 38.8 | 45.79 | 83 | 79 | 0.7943 | 0.7754 |
| | 12 | 1.575 | 1.686 | 38.9 | 45.9 | 84 | 80 | 0.7944 | 0.7757 |
| | 13 | 1.573 | 1.686 | 38.8 | 45.89 | 84 | 80 | 0.7936 | 0.777 |
| | 14 | 1.573 | 1.686 | 38.9 | 45.88 | 82 | 79 | 0.7948 | 0.7775 |
| | 15 | 1.574 | 1.686 | 38.9 | 45.9 | 84 | 80 | 0.7932 | 0.7762 |
| | 16 | 1.574 | 1.687 | 39.0 | 45.94 | 83 | 80 | 0.7926 | 0.7757 |
| | 17 | 1.575 | 1.686 | 38.9 | 45.98 | 83 | 79 | 0.7928 | 0.7759 |
| | 18 | 1.575 | 1.686 | 38.9 | 45.96 | 84 | 80 | 0.7919 | 0.7765 |
| | 19 | 1.574 | 1.686 | 38.9 | 45.96 | 85 | 79 | 0.7917 | 0.7753 |
| | 20 | 1.574 | 1.687 | 38.9 | 45.92 | 86 | 78 | 0.7924 | 0.7757 |
| | 21 | 1.574 | 1.687 | 39.0 | 45.92 | 84 | 79 | 0.7906 | 0.7746 |
| | 22 | 1.575 | 1.686 | 38.9 | 45.92 | 85 | 80 | 0.792 | 0.7761 |
| Control | 23 | 1.574 | 1.686 | 38.5 | 45.63 | 86 | 80 | 0.7925 | 0.7771 |
| | 24 | 1.575 | 1.687 | 39.0 | 45.91 | 84 | 77 | 0.783 | 0.7685 |
| | 25 | 1.576 | 1.687 | 39.0 | 45.96 | 83 | 78 | 0.7876 | 0.7717 |
| | 26 | 1.576 | 1.686 | 38.9 | 45.92 | 80 | 77 | 0.7829 | 0.7676 |
| | 27 | 1.576 | 1.687 | 38.9 | 45.88 | 79 | 74 | 0.7784 | 0.7633 |
| New Control | 28 | 1.576 | 1.687 | 38.7 | 45.74 | 82 | 79 | 0.788 | 0.7737 |

TABLE 34

| | Sample Nos. 1 through 16 | Sample Nos. 17 through 19 |
|---|---|---|
| SIZE POLE (inches) | 1.470 | 1.470 |
| WEIGHT (grams) | 32.7 g | 32.7 |
| COMPRESSION (RIEHLE) | 100 | 99 |
| C. O. R. | 0.7634 | 0.7609 |

Still additional trials were performed in which golf balls having cores as follows in Table 35 were made:

TABLE 35

Strata 90 Center
Molybdenum, Tungsten & Bismuth Powder as Fillers

| | 29 | 30 | 31 | 32 |
|---|---|---|---|---|
| Cariflex 80-1220 | 70 | 70 | 70 | 70 |
| Taktene 220 | 30 | 30 | 30 | 30 |
| Zinc Oxide | 31.5 | 6.0 | 6.0 | 6.0 |
| T. G. Regrind | 16 | 16 | 16 | 16 |
| Zinc Stearate | 16 | 16 | 16 | 16 |
| Zinc Diacrylate | 21.5 | 21.5 | 21.5 | 21.5 |
| Tungsten Powder | — | 20 | — | — |
| Bismuth Powder | — | — | 21 | — |
| Molybdenum Powder | — | — | — | 21 |
| 231 XL | 0.90 | 0.90 | 0.90 | 0.90 |
| | 185.90 | 180.40 | 181.40 | 181.40 |
| Size pole (inches) | 1.496 | 1.496 | 1.496 | 1.496 |
| Weight (grams) | 34.6 | 34.4 | 34.3 | 34.3 |
| Comp (Riehle) | 107 | 116 | 116 | 116 |
| C. O. R. | .769 | .770 | .767 | .766 |
| 'Nes' Factor | 876 | 886 | 883 | 882 |
| Tungsten | Sp. Gr 19.35 | | | |

TABLE 35-continued

Strata 90 Center
Molybdenum, Tungsten & Bismuth Powder as Fillers

|  | 29 | 30 | 31 | 32 |
|---|---|---|---|---|
| Bismuth | 9.78 | | | |
| Molybdenum | 10.2 | | | |

The invention has been described with reference to the preferred embodiment. Obviously, modifications and alterations will occur to others upon reading and understanding the proceeding detailed description. It is intended that the invention be construed as including all such modifications and alterations insofar as they come within the scope of the appended claims or the equivalents thereof.

We claim:

1. A golf ball comprising:
   a core formed from a composition including (i) a first polybutadiene, said first polybutadiene polymerized in the presence of a cobalt or nickel-based catalyst, said polybutadiene prior to curing, having a Mooney viscosity of from about 65 to about 85, (ii) a second polybutadiene, said second polybutadiene polymerized in the presence of a neodymium or lanthanide series catalyst, and (iii) a metallic filler material serving to increase the density of said core;
   an inner cover layer molded about said core, the inner cover layer comprising a high acid ionomer including at least 16 percent by weight of an alpha, beta-unsaturated carboxylic acid; and
   an outer cover layer molded on said inner cover layer, said outer cover layer comprising a relatively soft polymeric material selected from the group consisting of low flexural modulus ionomer resins and non-ionomeric thermoplastic elastomers.

2. The golf ball of claim 1 wherein said first polybutadiene, prior to curing, has a Mooney viscosity of from about 70 to about 83.

3. The golf ball of claim 1 wherein said first polybutadiene, prior to curing, has a polydispersity of from about 1.9 to about 3.9.

4. The golf ball of claim 3 wherein said first polybutadiene has a polydispersity of from about 2.4 to about 3.1.

5. The golf ball of claim 4 wherein said first polybutadiene has a polydispersity of about 2.7.

6. The golf ball of claim 1 wherein said first polybutadiene, prior to curing, has a number average molecular weight of from about 90,000 to about 130,000.

7. The golf ball of claim 6 wherein said first polybutadiene has a number average molecular weight of from about 100,000 to about 120,000.

8. The golf ball of claim 1 wherein said first polybutadiene, prior to curing, has a weight average molecular weight of from about 250,000 to about 350,000.

9. The golf ball of claim 8 wherein said first polybutadiene has a weight average molecular weight of from about 290,000 to about 310,000.

10. The golf ball of claim 1 wherein said first polybutadiene, prior to curing, has a Z-average molecular weight of from about 600,000 to about 750,000.

11. The golf ball of claim 10 wherein said first polybutadiene has a Z-average molecular weight of from about 660,000 to about 700,000.

12. The golf ball of claim 1 wherein said first polybutadiene, prior to curing, has a peak molecular weight of from about 150,000 to about 200,000.

13. The golf ball of claim 12 wherein said first polybutadiene has a peak molecular weight of from about 170,000 to about 180,000.

14. The golf ball of claim 1 wherein said composition comprises said first polybutadiene in a proportion of about 45 parts or less per 100 parts of said first polybutadiene and of about 55 parts or more per 100 parts of said second polybutadiene.

15. The golf ball of claim 14 wherein said composition comprises said first poybutadiene in a proportion of about 40 parts or less per 100 parts of said first polybutadiene and said second polybutadiene.

16. The golf ball of claim 1 wherein said second polybutadiene exhibits a Mooney viscosity, prior to curing, of from about 35 to about 70.

17. The golf ball of claim 16 wherein said second polybutadiene exhibits a Mooney viscosity, prior to curing, of from about 40 to about 65.

18. The golf ball of claim 17 wherein said second polybutadiene exhibits a Mooney viscosity of about 45 to about 60.

19. The golf ball of claim 1 wherein said first polybutadiene is polymerized in the presence of a cobalt catalyst, and said second polybutadiene is polymerized in the presence of a neodymium catalyst.

20. The golf ball according to claim 1 wherein said inner cover layer comprises a high acid ionomer resin comprising a copolymer of about 17 percent to about 25 percent by weight of an alpha, beta-unsaturated carboxylic acid.

21. The golf ball according to claim 1 wherein said inner cover layer comprises a high acid ionomer resin comprising a copolymer of about 18.5 percent to about 21.5 percent by weight of an alpha, beta-unsaturated carboxylic acid.

22. The golf ball according to claim 1 further comprising:
   a mantle layer disposed between said inner cover layer and said core.

23. The golf ball according to claim 22 wherein said mantle layer includes a metallic filler material.

24. The golf ball according to claim 1 wherein said outer cover layer comprises a low flexural modulus ionomer resin which includes a blend of a hard high modulus ionomer with a soft low modulus ionomer, said high modulus ionomer being a sodium, zinc, magnesium or lithium salt of a copolymer having from 2 to 8 carbon atoms and an unsaturated monocarboxylic acid having from 3 to 8 carbon atoms, said low modulus ionomer being a sodium or zinc salt of a terpolymer of an olefin having 2 to 8 carbon atoms, acrylic acid and an unsaturated monomer of the acrylate ester class having from 1 to 21 carbon atoms.

25. The golf ball according to claim 24 wherein said outer layer composition includes 90 to 10 percent by weight of said hard high modulus ionomer resin and about 10 to 90 percent by weight of said soft low modulus ionomer resin.

26. The golf ball according to claim 24 wherein said outer layer composition includes 75 to 25 percent by weight of said hard high modulus ionomer resin and about 25 to 75 percent by weight of said soft low modulus ionomer resin.

27. The golf ball according to claim 1 wherein said non-ionomeric thermoplastic elastomer is a polyester polyurethane.

28. The golf ball according to claim 1 wherein said non-ionomeric thermoplastic elastomer is a polyester elastomer.

29. The golf ball according to claim 1 wherein said non-ionomeric thermoplastic elastomer is a polyether amide.

30. The golf ball of claim 1 wherein said metallic filler material is selected from the group consisting of bismuth, boron, brass, bronze, cobalt, copper, inconnel, iron, molybdenum, nickel, stainless steel, titanium, tungsten, zirconium, and combinations thereof.

31. The golf ball of claim 1 wherein said metallic filler material is selected from the group consisting of bismuth, boron, brass, bronze, cobalt, copper, inconnel, iron, molybdenum, nickel, stainless steel, titanium, tungsten, zirconium, and combinations thereof.

32. A golf ball comprising:
   a core formed from a composition including (i) from about 80 parts to about 120 parts by weight of elastomer components, said elastomer components including a first polybutadiene, said first polybutadiene synthesized in the presence of a cobalt or nickel catalyst, which prior to curing, exhibits a Mooney viscosity of from about 65 to about 85, and a second polybutadiene, said second polybutadiene synthesized in the presence of a neodymium or lanthanide series catalyst, and (ii) at least about 60 parts by weight of non-elastomer components including at least one metallic filler material serving to increase the density of said core;
   an inner cover layer molded on said core, the inner cover layer comprising a high acid ionomer including at least 16 percent by weight of an alpha, beta-unsaturated carboxylic acid; and
   an outer cover layer molded on said inner cover layer, said outer cover layer comprising a relatively soft polymeric material selected from the group consisting of low flexural modulus ionomer resins and non-ionomeric thermoplastic elastomers.

33. The golf ball of claim 32 wherein said composition includes (i) about 100 parts by weight of elastomer components and (ii) from about 60 to about 80 parts by weight of non-elastomer components.

34. The golf ball of claim 32 wherein said first polybutadiene, prior to curing, has a Mooney viscosity of from about 70 to about 83.

35. The golf ball of claim 32 wherein said first polybutadiene, prior to curing, has a polydispersity of from about 1.9 to about 3.9.

36. The golf ball of claim 35 wherein said first polybutadiene has a polydispersity of from about 2.4 to about 3.1.

37. The golf ball of claim 32 wherein said first polybutadiene has a polydispersity of about 2.7.

38. The golf ball of claim 32 wherein said composition comprises said first polybutadiene in a proportion of less than 50 parts per 100 parts of said first polybutadiene and said second polybutadiene.

39. The golf ball of claim 32 wherein said composition comprises said first polybutadiene in a proportion of about 45 parts or less per 100 parts of said first polybutadiene and said second polybutadiene.

40. The golf ball of claim 32 wherein said second polybutadiene exhibits a Mooney viscosity, prior to curing, of from about 35 to about 70.

41. The golf ball of claim 40 wherein said second polybutadiene exhibits a Mooney viscosity, prior to curing, of from about 40 to about 65.

42. The golf ball of claim 41 wherein said second polybutadiene exhibits a Mooney viscosity of about 45 to about 60.

43. The golf ball of claim 32 wherein said first polybutadiene is synthesized in the presence of a cobalt catalyst, and said second polybutadiene is synthesized in the presence of a neodymium catalyst.

44. The golf ball according to claim 32 wherein said inner cover layer comprises a high acid ionomer resin comprising a copolymer of about 17 percent to about 25 percent by weight of an alpha, beta-unsaturated carboxylic acid.

45. The golf ball according to claim 32 wherein said inner cover layer comprises a high acid ionomer resin comprising a copolymer of about 18.5% to about 21.5% by weight of an alpha, beta-unsaturated carboxylic acid.

46. The golf ball according to claim 32 further comprising:
   a mantle layer disposed between said inner cover layer and said core.

47. The golf ball according to claim 46 wherein said mantle layer includes a metallic filler material.

48. The golf ball according to claim 32 wherein said outer cover layer comprises a low flexural modulus ionomer resin which includes a blend of a hard high modulus ionomer with a soft low modulus ionomer, the high modulus ionomer being a sodium, zinc, magnesium or lithium salt of a copolymer having from 2 to 8 carbon atoms and an unsaturated monocarboxylic acid having from 3 to 8 carbon atoms, the low modulus ionomer being a sodium or zinc salt of a terpolymer of an olefin having 2 to 8 carbon atoms, acrylic acid and an unsaturated monomer of the acrylate ester class having from 1 to 21 carbon atoms.

49. The golf ball according to claim 48 wherein said outer layer composition includes 90 to 10 percent by weight of said hard high modulus ionomer resin and about 10 to 90 percent by weight of said soft low modulus ionomer resin.

50. The golf ball according to claim 48 wherein said outer layer composition includes 75 to 25 percent by weight of the hard high modulus ionomer resin and about 25 to 75 percent by weight of said soft low modulus ionomer resin.

51. The golf ball according to claim 32 wherein said non-ionomeric thermoplastic elastomer is a polyester polyurethane.

52. The golf ball according to claim 32 wherein said non-ionomeric thermoplastic elastomer is a polyester elastomer.

53. The golf ball according to claim 32 wherein said non-ionomeric thermoplastic elastomer is a polyether amide.

54. The golf ball according to claim 32 wherein said inner cover layer has a modulus of from about 15,000 to about 70,000 psi, and said outer layer comprises a blend of i) a sodium or zinc salt of a copolymer having from 2 to 8 carbon atoms and an unsaturated monocarboxylic acid having from 3 to 8 carbon atoms, and ii) a sodium or zinc salt of a terpolymer of an olefin having 2 to 8 carbon atoms, acrylic acid and an unsaturated monomer of the acrylate ester class having from 1 to 21 carbon atoms, said outer cover layer having a modulus in a range of about 1,000 to about 30,000 psi.

55. The golf ball of claim 32 wherein said metallic filler material is selected from the group consisting of bismuth, boron, brass, bronze, cobalt, copper, inconnel, iron, molybdenum, nickel, stainless steel, titanium, tungsten, zirconium, and combinations thereof.

56. A golf ball comprising:
   a core formed from a composition including (i) a first polybutadiene, said first polybutadiene synthesized in the presence of a cobalt or nickel catalyst and, prior to curing of said core, having a polydispersity of from about 1.9 to about 3.9 and having a Mooney viscosity of from about 65 to about 85, (ii) a second polybutadiene, said second polybutadiene synthesized in the presence of neodymium or a lanthanide series catalyst, and (iii) a metallic filler material;
   an inner cover layer molded on said core, the inner cover layer comprising a high acid ionomer including at least 16 percent by weight of an alpha, beta-unsaturated carboxylic acid;

an outer cover layer molded on said inner cover layer, said outer cover layer comprising a relatively soft polymeric material selected from the group consisting of low flexural modulus ionomer resins and non-ionomeric thermoplastic elastomers.

57. The golf ball of claim 56 wherein said first polybutadiene, prior to curing of said core, has a number average molecular weight of from about 90,000 to about 130,000.

58. The golf ball of claim 56 wherein said composition comprises said first polybutadiene in a proportion of less than 50 parts per 100 parts of said first polybutadiene and said second polybutadiene.

59. The golf ball of claim 58 wherein said composition comprises said first polybutadiene in a proportion of about 45 parts or less per 100 parts of said first polybutadiene and said second polybutadiene.

60. The golf ball of claim 56 wherein said second polybutadiene exhibits a Mooney viscosity, prior to curing, of from about 40 to about 65.

61. The golf ball of claim 56 wherein said first polybutadiene is synthesized in the presence of a cobalt catalyst, and said second polybutadiene is synthesized in the presence of a neodymium catalyst.

62. The golf ball according to claim 56 wherein said inner cover layer comprises a high acid ionomer resin comprising a copolymer of about 17 percent to about 25 percent by weight of an alpha, beta-unsaturated carboxylic acid.

63. The golf ball according to claim 56 wherein said inner cover layer comprises a high acid ionomer resin comprising a copolymer of about 18.5 percent to about 21.5 percent by weight of an alpha, beta-unsaturated carboxylic acid.

64. The golf ball according to claim 56 further comprising:

a mantle layer disposed between said inner cover layer and said core.

65. The golf ball according to claim 64 wherein said mantle layer includes a metallic filler material.

66. The golf ball according to claim 56 wherein said outer cover layer comprises a low flexural modulus ionomer resin which includes a blend of a hard high modulus ionomer with a soft low modulus ionomer, the high modulus ionomer being a sodium, zinc, magnesium or lithium salt of a copolymer having from 2 to 8 carbon atoms and an unsaturated monocarboxylic acid having from 3 to 8 carbon atoms, the low modulus ionomer being a sodium or zinc salt of a terpolymer of an olefin having 2 to 8 carbon atoms, acrylic acid and an unsaturated monomer of the acrylate ester class having from 1 to 21 carbon atoms.

67. The golf ball according to claim 66 wherein said outer layer composition includes 90 to 10 percent by weight of said hard high modulus ionomer resin and about 10 to 90 percent by weight of said soft low modulus ionomer resin.

68. The golf ball, according to claim 66 wherein said outer layer composition includes 75 to 25 percent by weight of the hard high modulus ionomer resin and about 25 to 75 percent by weight of said soft low modulus ionomer resin.

69. The golf ball according to claim 56 wherein said non-ionomeric thermoplastic elastomer is a polyester polyurethane.

70. The golf ball according to claim 56 wherein said non-ionomeric thermoplastic elastomer is a polyester elastomer.

71. The golf ball according to claim 56 wherein said non-ionomeric thermoplastic elastomer is a polyether amide.

72. The golf ball according to claim 56 wherein said inner cover layer has a modulus of from about 15,000 to about 70,000 psi, and said outer layer comprises a blend of i) a sodium or zinc salt of a copolymer having from 2 to 8 carbon atoms and an unsaturated monocarboxylic acid having from 3 to 8 carbon atoms, and ii) a sodium or zinc salt of a terpolymer of an olefin having 2 to 8 carbon atoms, acrylic acid and an unsaturated monomer of the acrylate ester class having from 1 to 21 carbon atoms, said outer cover layer having a modulus in range of about 1,000 to about 30,000 psi.

73. The golf ball of claim 56 wherein said metallic filler material is selected from the group consisting of bismuth, boron, brass, bronze, cobalt, copper, inconnel, iron, molybdenum, nickel, stainless steel, titanium, tungsten, zirconium, and combinations thereof.

74. The golf ball according to claim 73 wherein said inner cover layer comprises a high acid ionomer resin comprising a copolymer of about 18.5% to about 21.5% by weight of an alpha, beta-unsaturated carboxylic acid.

75. A method for producing a golf ball, said method comprising:

combining a first polybutadiene having a Mooney viscosity of from about 65 to about 85 and having a polydispersity of from about 1.9 to about 3.9, with a second polybutadiene synthesized in the presence of a neodymium or lanthanide series catalyst, and further with at least one metallic filler material to form a core composition;

molding said core composition to form a golf ball core;

forming an inner cover layer about said golf ball core; and forming an outer cover layer on said inner cover layer to produce said golf ball.

76. The golf ball produced by the method of claim 73.

77. A golf ball comprising:

a core formed from a composition including polybutadiene and at least one metallic filler material, said polybutadiene consisting essentially of a solid polybutadiene and wherein said polybutadiene prior to curing, has a Mooney viscosity of greater than 70 and a polydispersity of less than 4;

an inner cover layer molded on said core, the inner cover layer comprising a high acid ionomer including at least 16% by weight of an alpha, beta-unsaturated carboxylic acid; and an outer cover layer molded on said inner cover layer, said outer cover layer comprising a relatively soft polymeric material selected from the group consisting of low flexural modulus ionomer resins and non-ionomeric thermoplastic elastomers.

78. The golf ball of claim 77 wherein said polybutadiene, prior to curing, has a Mooney viscosity of from about 73 to about 83.

79. The golf ball of claim 77 wherein said polybutadiene, prior to curing, has a polydispersity of from about 1.9 to about 3.9.

80. The golf ball of claim 79 wherein said polybutadiene has a polydispersity of from about 2.4 to about 3.1.

81. The golf ball of claim 80 wherein said polybutadiene has a polydispersity of about 2.7.

82. The golf ball of claim 77 wherein said polybutadiene, prior to curing, has a number average molecular weight of from about 90,000 to about 130,000.

83. The golf ball of claim 82 wherein said polybutadiene has a number average molecular weight of from about 100,000 to about 120,000.

84. The golf ball of claim 77 wherein said polybutadiene, prior to curing, has a weight average molecular weight of from about 250,000 to about 350,000.

85. The golf ball of claim 84 wherein said polybutadiene has a weight average molecular weight of from about 290,000 to about 310,000.

86. The golf ball of claim 75 wherein said polybutadiene, prior to curing, has a Z-average molecular weight of from about 600,000 to about 750,000.

87. The golf ball of claim 84 wherein said polybutadiene has a Z-average molecular weight of from about 660,000 to about 700,000.

88. The golf ball of claim 75 wherein said polybutadiene, prior to curing, has a peak molecular weight of from about 150,000 to about 200,000.

89. The golf ball of claim 86 wherein said polybutadiene has a peak molecular weight of from about 170,000 to about 180,000.

90. The golf ball according to claim 75 wherein said inner cover layer comprises a high acid ionomer resin comprising a copolymer of about 17 percent to about 25 percent by weight of an alpha, beta-unsaturated carboxylic acid.

91. The golf ball according to claim 77 further comprising:
a mantle layer disposed between said inner cover layer and said core.

92. The golf ball according to claim 72 wherein said mantle layer includes a metallic filler material.

93. The golf ball according to claim 77 wherein said outer cover layer comprises a low flexural modulus ionomer resin which includes a blend of a hard high modulus ionomer with a soft low modulus ionomer, the high modulus ionomer being a sodium, zinc, magnesium or lithium salt of a copolymer having from 2 to 8 carbon atoms and an unsaturated monocarboxylic acid having from 3 to 8 carbon atoms, the low modulus ionomer being a sodium or zinc salt of a terpolymer of an olefin having 2 to 8 carbon atoms, acrylic acid and an unsaturated monomer of the acrylate ester class having from 1 to 21 carbon atoms.

94. The golf ball according to claim 93 wherein said outer layer composition includes 90 to 10 percent by weight of said hard high modulus ionomer resin and about 10 to 90 percent by weight of said soft low modulus ionomer resin.

95. The golf ball according to claim 93 wherein said outer layer composition includes 75 to 25 percent by weight of said hard high modulus ionomer resin and about 25 to 75 percent by weight of said soft low modulus ionomer resin.

96. The golf ball according to claim 77 wherein said non-ionomeric thermoplastic elastomer is a polyester polyurethane.

97. The golf ball according to claim 77 wherein said non-ionomeric thermoplastic elastomer is a polyester elastomer.

98. The golf ball according to claim 77 wherein said non-ionomeric thermoplastic elastomer is a polyether amide.

99. The golf ball according to claim 77 wherein said inner cover layer has a modulus of from about 15,000 to about 70,000 psi, and said outer layer comprises a blend of i) a sodium or zinc salt of a copolymer having from 2 to 8 carbon atoms and an unsaturated monocarboxylic acid having from 3 to 8 carbon atoms, and ii) a sodium or zinc salt of a terpolymer of an olefin having 2 to 8 carbon atoms, acrylic acid and an unsaturated monomer of the acrylate ester class having from 1 to 21 carbon atoms, said outer cover layer having a modulus in a range of about 1,000 to about 30,000 psi.

100. The golf ball of claim 77 wherein said metallic filler material is selected from the group consisting of bismuth, boron, brass, bronze, cobalt, copper, inconnel, iron, molybdenum, nickel, stainless steel, titanium, tungsten, zirconium and combinations thereof.

101. A golf ball comprising:
a core formed from a composition including (i) from about 80 parts to about 120 parts by weight of elastomer components, said elastomer components including a polybutadiene, wherein said polybutadiene consists essentially of a solid polybutadiene, which prior to curing, exhibits a Mooney viscosity of from about 73 to about 85 and a polydispersity of about 1.9 to about 3.9, and (ii) at least about 60 parts by weight of non-elastomer components including a metallic filler material;
an inner cover layer molded about said core, the inner cover layer comprising a high acid ionomer including at least 16 percent by weight of an alpha, beta-unsaturated carboxylic acid; and
an outer cover layer molded on said inner cover layer, said outer cover layer comprising a relatively soft polymeric material selected from the group consisting of low flexural modulus ionomer resins and non-ionomeric thermoplastic elastomers.

102. The golf ball of claim 101 wherein said polybutadiene is polymerized in the presence of a catalyst selected from the group consisting of cobalt catalyst, lanthanum catalyst, nickel catalyst, aluminum catalyst, boron catalyst, lithium catalyst, titanium catalyst, and combinations thereof.

103. The golf ball of claim 102 wherein said polybutadiene is polymerized in the presence of a cobalt catalyst.

104. The golf ball of claim 101 wherein said composition includes (i) about 100 parts by weight of elastomer components and (ii) from about 60 to about 80 parts by weight of non-elastomer components.

105. The golf ball of claim 101 wherein said polybutadiene, prior to curing, has a Mooney viscosity of from about 73 to about 83.

106. The golf ball of claim 101 wherein said polybutadiene, prior to curing, has a polydispersity of from about 1.9 to about 3.7.

107. The golf ball of claim 106 wherein said polybutadiene has a polydispersity of from about 2.4 to about 3.1.

108. The golf ball of claim 107 wherein said polybutadiene has a polydispersity of about 2.7.

109. The golf ball according to claim 101 wherein said inner cover layer comprises a high acid ionomer resin comprising a copolymer of about 17 percent to about 25 percent by weight of an alpha, beta-unsaturated carboxylic acid.

110. The golf ball according to claim 109 wherein said inner cover layer comprises a high acid ionomer resin comprising a copolymer of about 18.5 percent to about 21.5 percent by weight of an alpha beta-unsaturated carboxylic acid.

111. The golf ball according to claim 101 further comprising:
a mantle layer disposed between said inner cover layer and said core.

112. The golf ball according to claim 111 wherein said mantle layer includes a metallic filler material.

113. The golf ball according to claim 101 wherein said outer cover layer comprises a low flexural modulus ionomer resin which includes a blend of a hard high modulus ionomer with a soft low modulus ionomer, said high modulus ionomer being a sodium, zinc, magnesium or lithium salt of a copolymer having from 2 to 8 carbon atoms and an unsaturated monocarboxylic acid having from 3 to 8 carbon atoms, said low modulus ionomer being a sodium or zinc salt of a terpolymer of an olefin having 2 to 8 carbon atoms, acrylic acid and an unsaturated monomer of the acrylate ester class having from 1 to 21 carbon atoms.

114. The golf ball according to claim 113 wherein said outer layer composition includes 90 to 10 percent by weight of said hard high modulus ionomer resin and about 10 to 90 percent by weight of said soft low modulus ionomer resin.

115. The golf ball according to claim 113 wherein said outer layer composition includes 75 to 25 percent by weight of said hard high modulus ionomer resin and about 25 to 75 percent by weight of said soft low modulus ionomer resin.

116. The golf ball according to claim 101 wherein said non-ionomeric thermoplastic elastomer is a polyester polyurethane.

117. The golf ball according to claim 101 wherein said non-ionomeric thermoplastic elastomer is a polyester elastomer.

118. The golf ball according to claim 101 wherein said non-ionomeric thermoplastic elastomer is a polyether amide.

119. A golf ball comprising:
   a core formed from a composition including a solid polybutadiene, a cross-linking agent, a metal soap, zinc oxide, and a metallic filler material, wherein said polybutadiene, prior to curing of said core, has a polydispersity of from about 1.9 to about 3.9 and a Mooney viscosity of greater than 70;
   an inner cover layer molded on said core, the inner cover layer comprising a high acid ionomer including at least 16 percent by weight of an alpha, beta-unsaturated carboxylic acid; and
   an outer cover layer molded on said inner cover layer, said outer cover layer comprising a relatively soft polymeric material selected from the group consisting of low flexural modulus ionomer resins and non-ionomeric thermoplastic elastomers.

120. The golf ball of claim 119 wherein said polybutadiene, prior to curing of said core, has a number average molecular weight of from about 90,000 to about 130,000.

121. The golf ball according to claim 119 wherein said inner cover layer comprises a high acid ionomer resin comprising a copolymer of about 17 percent to about 25 percent by weight of an alpha, beta-unsaturated carboxylic acid.

122. The golf ball according to claim 119 wherein said inner cover layer comprises a high acid ionomer resin comprising a copolymer of about 18.5 percent to about 21.5 percent by weight of an alpha, beta-unsaturated carboxylic acid.

123. The golf ball according to claim 119 further comprising:
   a mantle layer disposed between said inner cover layer and said core.

124. The golf ball according to claim 123 wherein said mantle layer includes a metallic filler material.

125. The golf ball according to claim 119 wherein said outer cover layer comprises a low flexural modulus ionomer resin which includes a blend of a hard high modulus ionomer with a soft low modulus ionomer, said high modulus ionomer being a sodium, zinc, magnesium or lithium salt of a copolymer having from 2 to 8 carbon atoms and an unsaturated monocarboxylic acid having from 3 to 8 carbon atoms, said low modulus ionomer being a sodium or zinc salt of a terpolymer of an olefin having 2 to 8 carbon atoms, acrylic acid and an unsaturated monomer of the acrylate ester class having from 1 to 21 carbon atoms.

126. The golf ball according to claim 125 wherein said outer layer composition includes 90 to 10 percent by weight of the hard high modulus ionomer resin and about 10 to 90 percent by weight of the soft low modulus ionomer resin.

127. The golf ball according to claim 125 wherein said outer layer composition includes 75 to 25 percent by weight of said hard high modulus ionomer resin and about 25 to 75 percent by weight of the soft low modulus ionomer resin.

128. The golf ball according to claim 119 wherein said ionomeric thermoplastic elastomer is a polyester polyurethane.

129. The golf ball according to claim 119 wherein said non-ionomeric thermoplastic elastomer is a polyester elastomer.

130. The golf ball according to claim 119 wherein said non-ionomeric thermoplastic elastomer is a polyether amide.

131. The golf ball according to claim 119 wherein said inner cover layer has a modulus of from about 15,000 to about 70,000 psi, and said outer layer comprises a blend of i) a sodium or zinc salt of a copolymer having from 2 to 8 carbon atoms and an unsaturated monocarboxylic acid having from 3 to 8 carbon atoms, and ii) a sodium or zinc salt of a terpolymer of an olefin having 2 to 8 carbon atoms, acrylic acid and an unsaturated monomer of the acrylate ester class having from 1 to 21 carbon atoms, said outer cover layer having a modulus in a range of about 1,000 to about 30,000 psi.

132. The golf ball of claim 119 wherein said metallic filler material is selected from the group consisting of bismuth, boron, brass, bronze, cobalt, copper, inconnel, iron, molybdenum, nickel, stainless steel, titanium, tungsten, zirconium, and combinations thereof.

133. A method for producing a golf ball, said method comprising:
   combining a solid polybutadiene having a Mooney viscosity of from about 73 to about 85 and having a polydispersity of from about 1.9 to about 3.9, with a metallic filler material and at least one other component to form a core composition;
   molding said core composition to form a golf ball core;
   forming an inner cover layer about said golf ball core; and
   forming an outer cover layer about said inner cover layer to form said golf ball.

134. The golf ball produced by the method of claim 133.

* * * * *

UNITED STATES PATENT AND TRADEMARK OFFICE
CERTIFICATE OF CORRECTION

PATENT NO. : 6,419,594 B1
DATED : July 16, 2002
INVENTOR(S) : R. Dennis Nesbitt, Mark L. Binette and Michael J. Sullivan It is certified that error appears in the above-identified patent and that said Letters Patent is hereby corrected as shown below:

<u>Title page,</u>
Item [63], Related U.S. Application Data,

-- [63] Continuation-in-part of application No. 09/248,016, filed on Feb. 10, 1999, now Pat. No. 6,258,302, which is a continuation-in-part of application No. 09/226,340, filed on Jan. 6, 1999, now Pat. No. 6,277,920 which is a continuation-in-part of application No. 09/226,727, filed Jan. 7, 1999, which is a" should read
-- Continuation-in-part of application No. 09/248,016, filed on Feb. 10, 1999, now Pat. No. 6,258,302; application No. 09/226,340 filed on Jan. 6, 1999, now Pat. No. 6,277,920; and application No. 09/226,727, filed on Jan. 7, 1999. --.

Signed and Sealed this

Nineteenth Day of November, 2002

*Attest:*

*Attesting Officer*

JAMES E. ROGAN
*Director of the United States Patent and Trademark Office*